US012498852B2

(12) United States Patent
Chang et al.

(10) Patent No.: US 12,498,852 B2
(45) Date of Patent: Dec. 16, 2025

(54) METHOD AND APPARATUS FOR PERFORMING STORAGE SPACE MANAGEMENT OF MEMORY DEVICE WITH AID OF DYNAMIC BLOCK CONFIGURATION

(71) Applicant: Silicon Motion, Inc., Hsinchu County (TW)

(72) Inventors: Chin-Chun Chang, Kaohsiung (TW); Sheng-Jui Wang, Hsinchu County (TW); Ling-Chi Hsu, Hsinchu (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 18/668,236

(22) Filed: May 19, 2024

(65) Prior Publication Data

US 2024/0411450 A1     Dec. 12, 2024

(30) Foreign Application Priority Data

Jun. 12, 2023 (TW) ................................ 112121836

(51) Int. Cl.
*G06F 3/06* (2006.01)
*G06F 12/1009* (2016.01)

(52) U.S. Cl.
CPC ............ *G06F 3/0608* (2013.01); *G06F 3/064* (2013.01); *G06F 3/0679* (2013.01); *G06F 12/1009* (2013.01)

(58) Field of Classification Search
None
See application file for complete search history.

(56) References Cited

U.S. PATENT DOCUMENTS

| | | | |
|---|---|---|---|
| 2018/0373438 A1* | 12/2018 | Bennett | G06F 12/0246 |
| 2019/0179698 A1 | 6/2019 | Liu | |
| 2019/0250822 A1* | 8/2019 | Choi | G06F 3/0656 |
| 2019/0317587 A1* | 10/2019 | Hsu | G06F 1/3268 |
| 2019/0324670 A1 | 10/2019 | Lee | |
| 2019/0354293 A1* | 11/2019 | Kwon | G06F 3/0679 |
| 2022/0083223 A1* | 3/2022 | Choi | G06F 3/0614 |

(Continued)

FOREIGN PATENT DOCUMENTS

| | | | | |
|---|---|---|---|---|
| CN | 112612722 A | * | 4/2021 | ......... G06F 12/0246 |
| TW | 201738900 A | | 11/2017 | |
| TW | 202008176 A | | 2/2020 | |

*Primary Examiner* — Yaima Rigol
*Assistant Examiner* — Elias Young Kim
(74) *Attorney, Agent, or Firm* — Winston Hsu

(57) ABSTRACT

A method for performing storage space management of a memory device with aid of dynamic block configuration includes: configuring at least one portion of blocks among a plurality of blocks to be multiple first blocks in a first region and multiple second blocks in a second region according to a first reserved block threshold; combining the multiple first blocks into a set of first superblocks in the first region; and combining at least one portion of second blocks among the multiple second blocks into a set of second superblocks in the second region, wherein the first reserved block threshold is less than a minimum non-damaged block count among respective non-damaged block counts of a plurality planes, for a memory controller to increase available storage capacity by increasing a ratio of a size of the second region to a size of the first region.

13 Claims, 12 Drawing Sheets

(56) References Cited

U.S. PATENT DOCUMENTS

2022/0269441 A1\* 8/2022 Kim ................ G11C 29/76
2024/0069776 A1\* 2/2024 Luo ................ G06F 3/0679
2024/0377960 A1\* 11/2024 Bennett .............. G06F 3/064

\* cited by examiner

METHOD AND APPARATUS FOR PERFORMING STORAGE SPACE MANAGEMENT OF MEMORY DEVICE WITH AID OF DYNAMIC BLOCK CONFIGURATION

BACKGROUND OF THE INVENTION

1. Field of the Invention

The present invention is related to memory control, and more particularly, to a method for performing storage space management of a memory device with aid of dynamic block configuration, and an associated apparatus (e.g., a memory controller of the memory device, the memory device, and an electronic device including the memory device).

2. Description of the Prior Art

According to related technologies, a memory device can be designed to have the ability to simultaneously access respective storage units of multiple flash memory chips in the memory device, to improve the throughput of data access. Some problems may occur, however. For example, the flash memory chips may include damaged storage units. If some storage units in a set of storage units to be accessed simultaneously are damaged, the access operations of the set of storage units may not be successful, and therefore the overall performance may be reduced. Related art solutions have tried to correct the problem, but further problems may be introduced. For example, as flash memory manufacturers attempt to increase storage capacity by enlarging three-dimensional (3D) NAND flash stack structures, process yields may decrease and/or the average number of damaged storage units may increase. This may cause memory devices using 3D NAND flash memory to fail tests regarding sufficient storage capacity. Thus, a novel method and associated architecture are needed for solving the problems without introducing any side effect or in a way that is less likely to introduce a side effect.

SUMMARY OF THE INVENTION

It is therefore one of the objectives of the present invention to provide a method for performing storage space management of a memory device with aid of dynamic block configuration, and an associated apparatus (e.g., a memory controller of the memory device, the memory device, and an electronic device including the memory device), to address the above-mentioned issues.

According to at least one embodiment of the present invention, a method for performing storage space management of a memory device with aid of dynamic block configuration is provided, wherein the method is applicable to a memory controller of the memory device, the memory device comprises the memory controller and a non-volatile (NV) memory, the NV memory comprises at least one NV memory element (e.g., one or more NV memory elements), and the at least one NV memory element comprises a plurality of blocks. The method comprises: utilizing the memory controller to configure at least one portion of blocks among the plurality of blocks as multiple first blocks in a first region and multiple second blocks in a second region according to a first reserved block threshold, to reserve the multiple first blocks for data access, wherein any of the plurality of blocks belongs to one of a plurality of planes of the at least one NV memory element, to allow the memory controller to configure blocks belonging to the plurality of planes, respectively, as a superblock; combining the multiple first blocks into a set of first superblocks in the first region, wherein a block count of first blocks within each first superblock in the set of first superblocks is equal to a first predetermined block count, and a superblock count of the set of first superblocks is equal to the first reserved block threshold; and combining at least one portion of second blocks among the multiple second blocks into a set of second superblocks in the second region, wherein a block count of second blocks within each second superblock in the set of second superblocks is less than the first predetermined block count, and the first reserved block threshold is less than a minimum non-damaged block count among respective non-damaged block counts of the plurality of planes, for the memory controller to increase an available storage capacity of the memory device by increasing a ratio of a size of the second region to a size of the first region.

In addition to the above method, the present invention also provides a memory controller of a memory device, wherein the memory device comprises the memory controller and an NV memory. The NV memory comprises at least one NV memory element (e.g., one or more NV memory elements), and the at least one NV memory element comprises a plurality of blocks. In addition, the memory controller comprises a processing circuit that is arranged to control the memory controller according to a plurality of host commands from a host device, to allow the host device to access the NV memory through the memory controller, wherein the processing circuit is arranged to perform storage space management of the memory device with aid of dynamic block configuration. The memory controller further comprises a transmission interface circuit. The transmission interface circuit is arranged to perform communications with the host device. For example, the memory controller configures at least one portion of blocks among the plurality of blocks as multiple first blocks in a first region and multiple second blocks in a second region according to a first reserved block threshold, to reserve the multiple first blocks for data access, wherein any of the plurality of blocks belongs to one of a plurality of planes of the at least one NV memory element, to allow the memory controller to configure blocks belonging to the plurality of planes, respectively, as a superblock. The memory controller combines the multiple first blocks into a set of first superblocks in the first region, wherein a block count of first blocks within each first superblock in the set of first superblocks is equal to a first predetermined block count, and a superblock count of the set of first superblocks is equal to the first reserved block threshold. The memory controller combines at least one portion of second blocks among the multiple second blocks into a set of second superblocks in the second region, wherein a block count of second blocks within each second superblock in the set of second superblocks is less than the first predetermined block count, and the first reserved block threshold is less than a minimum non-damaged block count among respective non-damaged block counts of the plurality of planes, for the memory controller to increase an available storage capacity of the memory device by increasing a ratio of a size of the second region to a size of the first region.

In addition to the method mentioned above, the present invention also provides the memory device comprising the memory controller mentioned above, wherein the memory device comprises: the NV memory, configured to store information; and the memory controller, coupled to the NV memory, configured to control operations of the memory device.

In addition to the method mentioned above, the present invention also provides an electronic device comprising the memory device mentioned above, wherein the electronic device further comprises the host device that is coupled to the memory device. The host device may comprise: at least one processor, arranged for controlling operations of the host device; and a power supply circuit, coupled to the at least one processor, arranged for providing power to the at least one processor and the memory device. In addition, the memory device provides the host device with storage space.

According to some embodiments, the apparatus may comprise at least one portion (e.g., a portion or all) of the electronic device. For example, the apparatus may comprise the memory controller within the memory device. In another example, the apparatus may comprise the memory device. In yet another example, the apparatus may comprise the electronic device.

According to some embodiments, the memory controller in the memory device may control operations of the memory device according to the method, and the memory device may be set in the electronic device. In addition, the memory device may store data for the host device. The memory device may read stored data in response to a host command from the host device, and provide data read from the NV memory to the host device.

The method and apparatus of the present invention can guarantee that the memory device can operate properly in various situations, and more particularly, can dynamically adjust at least one reserved block threshold to configure a first set of blocks and a second set of blocks among the plurality of blocks of the NV memory as a superblock corresponding to a first plane count per superblock and a superblock corresponding to a second plane count per superblock, respectively, for suitably reserving superblocks with the maximum throughput regarding data access and simultaneously maximizing the total storage capacity of the memory device, to achieve both requirements of storage capacity specifications and data access performance improvement. In addition, the present invention method and apparatus can solve the related art problems without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
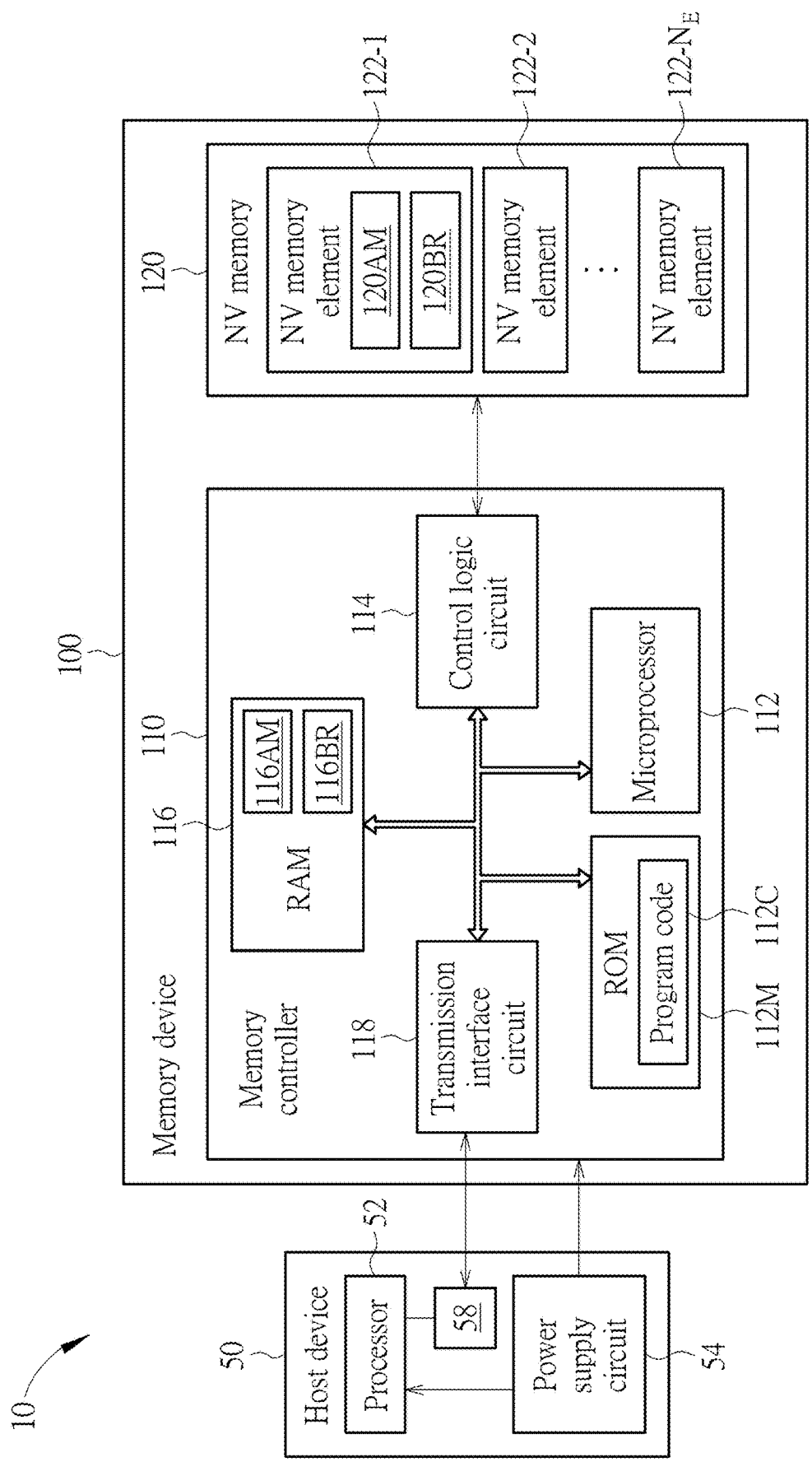
FIG. 1 is a diagram illustrating an electronic device according to an embodiment of the present invention.

FIG. 1 is a diagram illustrating an electronic device 100 according to an embodiment of the present invention, where the electronic device 10 may include a host device 50 and a memory device 100. The host device 50 may include at least one processor (e.g., one or more processors) which may be collectively referred to as the processor 52, a power supply circuit 54, and a transmission interface circuit 58, where the processor 52 and the transmission interface circuit 58 may be coupled to each other through a bus, and may be coupled to the power supply circuit 54 to obtain power. The processor 52 may be arranged to control operations of the host device 50, and the power supply circuit 54 may be arranged to provide the processor 52, the transmission interface circuit 58, and the memory device 100 with power, and output one or more driving voltages to the memory device 100, where the memory device 100 may provide the host device 50 with storage space, and may obtain the one or more driving voltages from the host device 50, to be the power of the memory device 100. Examples of the host device 50 may include, but are not limited to: a multifunctional mobile phone, a tablet computer, a wearable device, and a personal computer such as a desktop computer and a laptop computer. Examples of the memory device 100 may include, but are not limited to: a portable memory device (e.g., a memory card conforming to the SD/MMC, CF, MS or XD specification), a solid state drive (SSD), and various types of embedded memory devices (e.g., an embedded memory device conforming to the UFS or eMMC specification). According to this embodiment, the memory device 100 may include a controller such as a memory controller 110, and may further include a non-volatile (NV) memory 120, where the controller is arranged to access the NV memory 120, and the NV memory 120 is arranged to store information. The NV memory 120 may include at least one NV memory element (e.g., one or more NV memory elements), such as a plurality of NV memory elements 122-1, 122-2, ..., and 122-$N_E$, where "$N_E$" may represent a positive integer that is greater than one. For example, the NV memory 120 may be a flash memory, and the plurality of NV memory elements 122-1, 122-2, ..., and 122-$N_E$ may be a plurality of flash memory chips or a plurality of flash memory dies, respectively, but the present invention is not limited thereto.

As shown in FIG. 1, the memory controller 110 may include a processing circuit such as a microprocessor 112, a storage unit such as a read only memory (ROM) 112M, a control logic circuit 114, a Random Access Memory (RAM) 116, and a transmission interface circuit 118, where at least one portion (e.g., a portion or all) of the above components may be coupled to one another via a bus. The RAM 116 may be arranged to provide the memory controller 110 with internal storage space (for example, may temporarily store information), where the RAM 116 may be implemented by way of Static Random Access Memory (SRAM), but the present invention is not limited thereto. In addition, the ROM 112M of this embodiment is arranged to store a program code 112C, and the microprocessor 112 is arranged to execute the program code 112C to control the access of the NV memory 120. Please note that the program code 112C may also be stored in the RAM 116 or any type of memory. Additionally, the control logic circuit 114 may be arranged to control the NV memory 120. The control logic circuit 114 may include an error correction code (ECC) circuit (not shown in FIG. 1), wherein the ECC circuit may perform ECC encoding and ECC decoding to protect data and/or perform error correction. The transmission interface circuit 118 may conform to one or more communications specifications among various communications specifications (e.g., the Serial Advanced Technology Attachment (SATA) specification, Universal Serial Bus (USB) specification, Peripheral Component Interconnect Express (PCIe) specification, embedded Multi Media Card (eMMC) specification, and Universal Flash Storage (UFS) specification), and may perform communications with the host device 50 (e.g., the transmission interface circuit 58) according to the one or more communications specifications for the memory device 100. Similarly, the transmission interface circuit 58 may conform to the one or more communications specifications, and may perform communications with the memory device 100 (e.g., the transmission interface circuit 118) according to the one or more communications specification for the host device 50.

In this embodiment, the host device 50 may transmit a plurality of host commands and corresponding logical addresses to the memory controller 110, to access the NV memory 120 within the memory device 100, indirectly. The memory controller 110 receives the plurality of host commands and the logical addresses, and translates the plurality of host commands into memory operating commands (which may be referred to as operating commands, for brevity), respectively, and further controls the NV memory 120 with the operating commands to perform reading or writing/programing upon the memory units or data pages of specific physical addresses within the NV memory 120, where the physical addresses can be associated with the logical addresses. For example, the memory controller 110 may generate or update at least one logical-to-physical (L2P) address mapping table to manage the relationships between the physical addresses and the logical addresses. The NV memory 120 may store a global L2P address mapping table 120AM, for the memory controller 110 to control the memory device 100 to access data in the NV memory 120, but the present invention is not limited thereto. In addition, the memory controller 110 may generate or update at least one bad-block replacement (BR) management table (e.g., a BR management table 120BR), and the NV memory 120 may store the BR management table 120BR. The memory controller 110 may generate or update BR-management-related information for managing BR operations.

For better comprehension, the global L2P address mapping table 120AM and the BR management table 120BR may be located in a predetermined region within the NV memory element 122-1, such as a system region, but the present invention is not limited thereto. For example, the global L2P address mapping table 120AM may be divided into a plurality of local L2P address mapping tables, and the plurality of local L2P address mapping tables may be stored in one or more of the NV memory elements 122-1, 122-2, . . . , and 122-$N_E$, and more particularly, may be stored in the NV memory elements 122-1, 122-2, . . . , and 122-$N_E$, respectively. When there is a need, the memory controller 110 may load at least one portion (e.g., a portion or all) of the global L2P address mapping table 120AM into the RAM 116 or other memories. For example, the memory controller 110 may load a local L2P address mapping table among the plurality of local L2P address mapping tables into the RAM 116 to be a temporary L2P address mapping table 116AM, for accessing data in the NV memory 120 according to the local L2P address mapping table which is stored as the temporary L2P address mapping table 116AM, but the present invention is not limited thereto. The memory controller 110 may generate or update address mapping information in the temporary L2P address mapping table 116AM, and update the global L2P address mapping table 120AM according to the latest address mapping information in the temporary L2P address mapping table 116AM. In addition, the memory controller 110 may load the BR management table 120BR into the RAM 116 or other memories. For example, the memory controller 110 may load the BR management table 120BR into the RAM 116 as a temporary BR management table 116BR, for managing BR operations according to the temporary BR management table 116BR. The memory controller 110 may generate or update BR management related information in the temporary BR management table 116BR, and update the BR management table 120BR according to the latest BR management related information in the temporary BR management table 116BR.

In addition, the aforementioned at least one NV memory element (e.g., the one or more NV memory elements such as {122-1, 122-2, . . . , 122-$N_E$}) may include a plurality of blocks, wherein the minimum unit that the memory controller 110 may perform operations of erasing data upon the NV memory 120 may be a block, and the minimum unit that the memory controller 110 may perform operations of writing data upon the NV memory 120 may be a page, but the present invention is not limited thereto. For example, any NV memory element 122-$n$ (where "n" may represent any integer in the interval [1, $N_E$]) within the NV memory elements 122-1, 122-2, . . . , and 122-$N_E$ may include multiple blocks, and a block among the multiple blocks may include and record a specific number of pages, wherein the memory controller 110 may access a certain page of a certain block among the multiple blocks according to a block address and a page address. In some examples, the any NV memory element 122-$n$ may include multiple planes, a plane among the multiple planes may include multiple blocks, and a block among the multiple blocks may include and record a specific number of pages, wherein the memory controller 110 may access a certain page of a certain block within a certain plane among the multiple planes according to a plane address, a block address, and a page address.

According to some embodiments, the memory controller 110 may configure any block BLK among multiple blocks {BLK} as a single level cell (SLC) block, for performing storage of 1 bit per memory cell, but the present invention is not limited thereto. The memory controller 110 may configure the block BLK as an X-level cell (XLC) block, for performing storage of X bit per memory cell, wherein X may be a positive integer. For example, when X=1, the XLC block may represent the SLC block. In some examples, when X>1, the XLC block may represent any of a multiple level cell (MLC) block (e.g., a double level cell (DLC) block), a triple level cell (TLC) block, and a quadruple level cell (QLC) block.

In addition, the memory controller 110 may perform at least one test procedure upon the NV memory element 122-$n$ to determine any damaged block in any plane therein as a bad block, and record physical addresses of the bad block into the at least one BR management table (e.g., the BR management table 120BR and/or the temporary BR management table 116BR), but the present invention is not limited thereto. The memory controller 110 may select a good block (e.g., an non-damaged block) in any plane within the NV memory element 122-$n$ to replace the bad block, and more particularly, may record physical addresses of the good block into the at least one BR management table to indicate the good block replaces the bad block, and change the operations of accessing the bad block into the operations of accessing the good block. According to some embodiments, the memory controller 110 may dynamically adjust at least one reserved block threshold Reserved_BLK_Th to configure a first set of blocks and a second set of blocks within the multiple blocks {BLK} as a superblock corresponding to a plane count per superblock Plane_CNT_per_SB(1) and a superblock corresponding to a plane count per superblock Plane_CNT_per_SB(2), respectively, for appropriately reserving superblocks with the maximum throughput (regarding data access), and simultaneously maximize the total storage capacity of the memory device 100, to achieve both requirements of storage capacity specifications and data access performance improvement.

Figure 2:
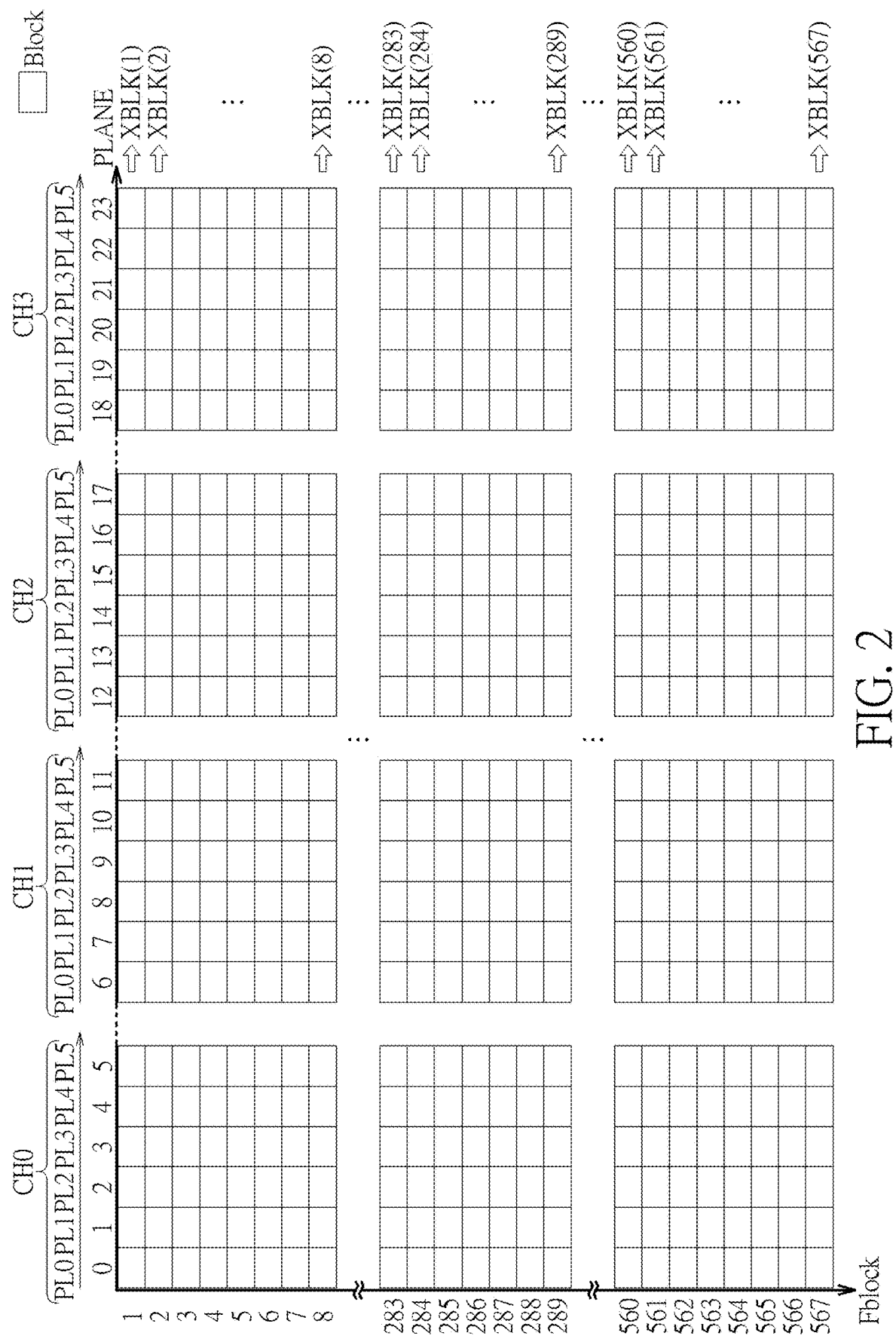
FIG. 2 is a diagram illustrating a block combination control scheme.

FIG. 2 is a diagram illustrating a block combination control scheme. Under a condition that the NV memory element 122-$n$ is configured in a certain channel Ch(i) among multiple channels {Ch(i)}, the memory controller 110 may access the NV memory element 122-$n$ at the channel Ch (i), and more particularly, may access any block BLK (k) in the multiple blocks {BLK(k)} of any plane PL(j) in multiple planes {PL(j)} within the NV memory element 122-$n$. For better comprehension, assume that the multiple channels {C(i)} may include 4 channels {CH(i)|i=0, 1, 2, 3}, such as channels {CH0, CH1, CH2, CH3}, the multiple planes {PL (j)} may include 6 planes {PL(j)|j=0, 1, 2, 3, 4, 5}, such as planes {PL0, PL1, PL2, PL3, PL4, PL5}, and the multiple blocks {BLK(k)} may include 567 blocks {BLK (k)|k=1, 2, . . . , 567}, wherein a channel count CNT_CH of the multiple channels {Ch(i)} is equal to 4, a plane count CNT_PL of the multiple planes {PL(j)} is equal to 6, and a block count CNT_BLK of the multiple blocks {BLK(k)} is equal to 567, but the present invention is not limited thereto. According to some embodiments, the channel count CNT_CH, the plane count CNT_PL, and the block count CNT_BLK may vary. In addition, the memory controller 110 may combine blocks {BLK(k)} corresponding to a block index k in all planes {PL(j)} of all channels {CH(i)} into a superblock XBLK (k) corresponding to the same block index k, to simultaneously access these blocks {BLK (k)} in the superblock XBLK (k) by the same block address BLK_Add (k). In this way, the memory controller 110 may simultaneously access all blocks {BLK(k)} of any superblock XBLK (k) among multiple superblocks {XBLK(k)} (e.g., 567 superblocks {XBLK(k)|k=1, 2, . . . , 567}), to achieve the maximum throughput. In addition, all planes {PL(j)} of all channels {CH(i)}, such as the respective planes {PL0, PL1, PL2, PL3, PL4, PL5} of the channels {CH0, CH1, CH2, CH3}, may be illustrated on the horizontal axis by utilizing numbers of global planes PLANE (e.g., {0, 1, . . . , 23}), and all blocks {BLK(k)} of any plane PL(j) of any channel CH(i), such as blocks {BLK(1), . . . , BLK(567)}, may be illustrated on the vertical axis by utilizing numbers of physical blocks Fblock (e.g., {1, 2, . . . , 567}), but the present invention is not limited thereto.

Figure 3A:
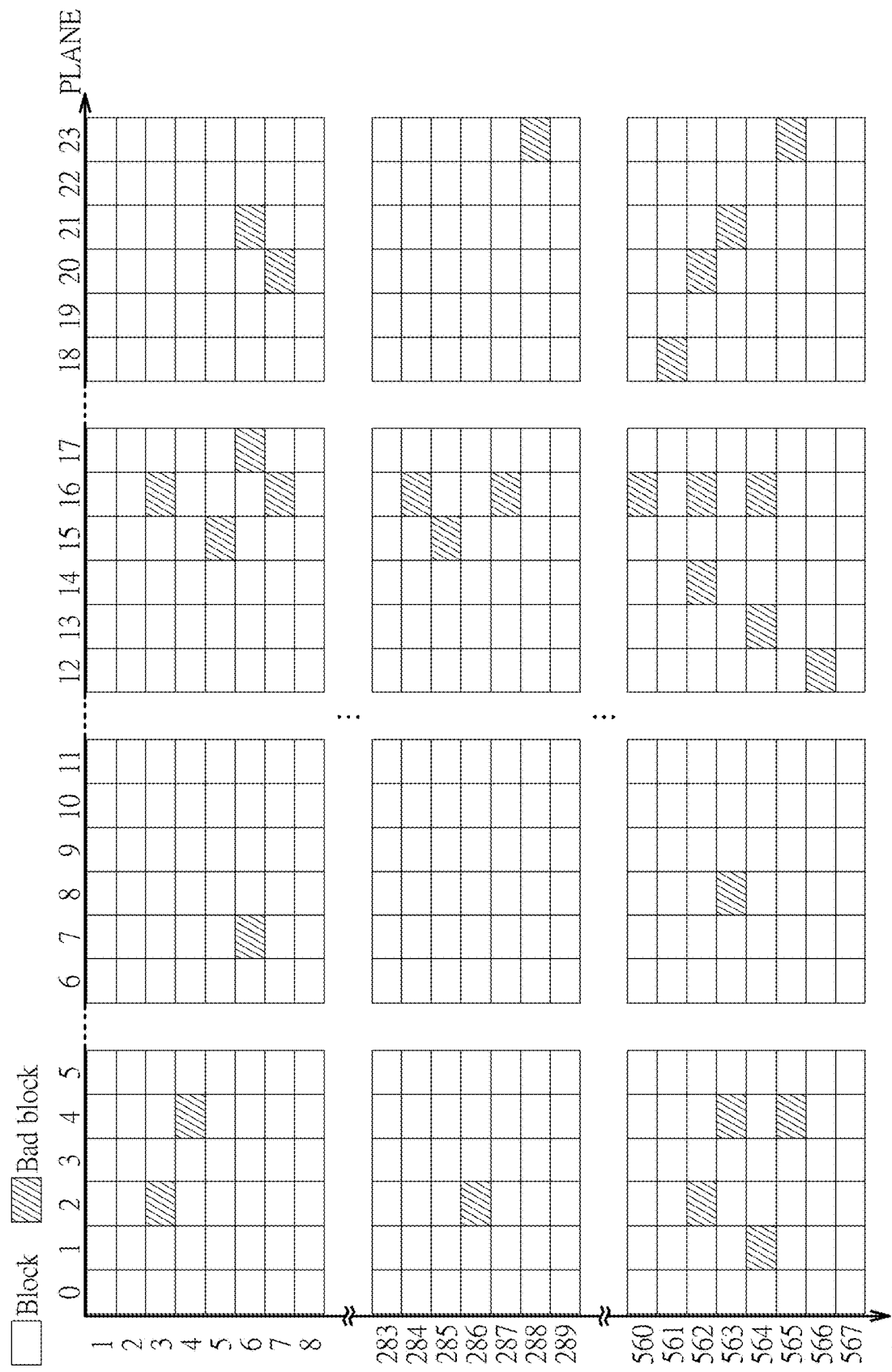
FIG. 3A is a diagram illustrating an example of bad block distribution before replacement processing of a block replacement control scheme.
Figure 3B:
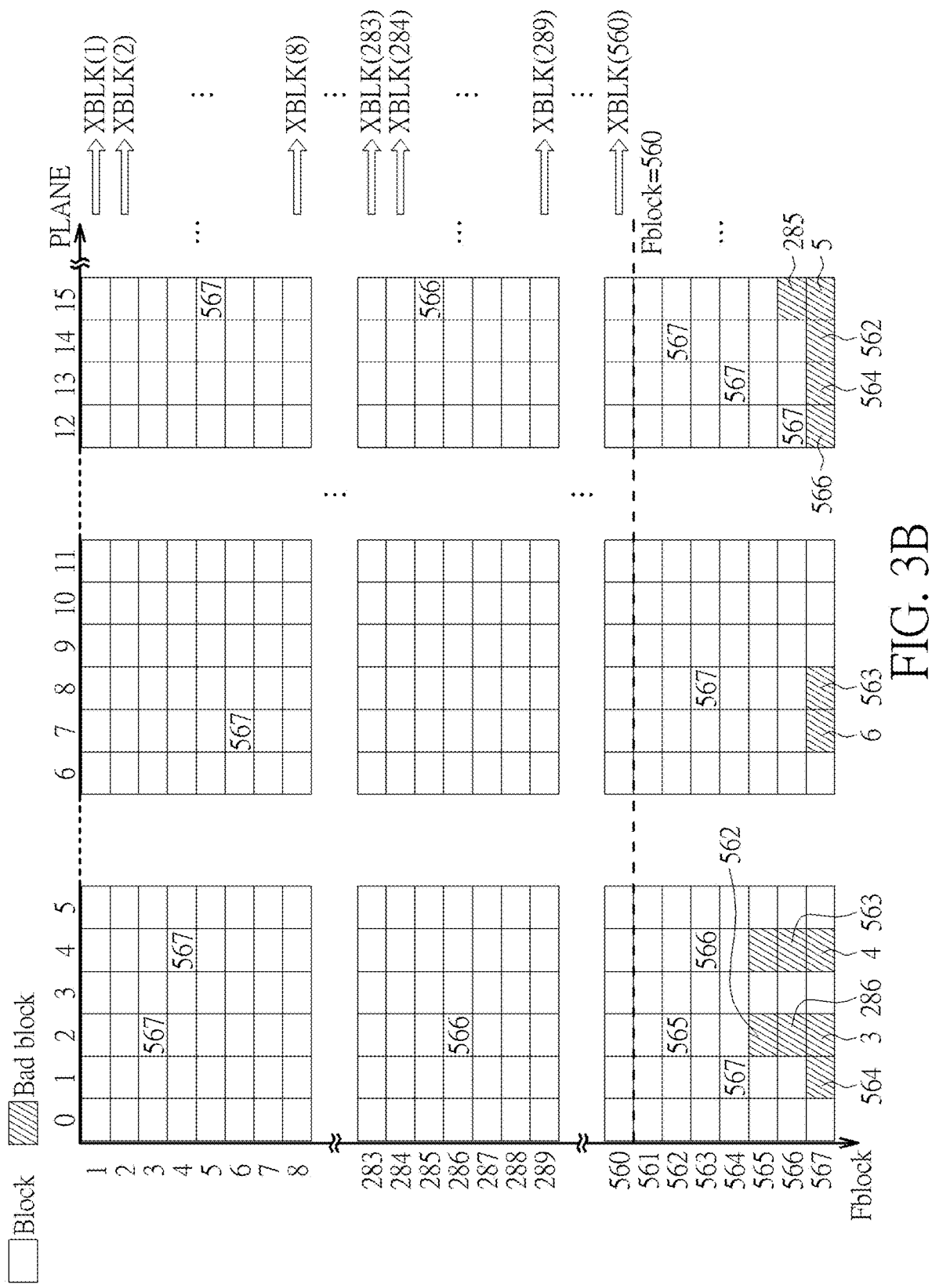
FIG. 3B is a diagram illustrating some implementation details of an example of block combinations after the replacement processing of the block replacement control scheme.
Figure 3C:
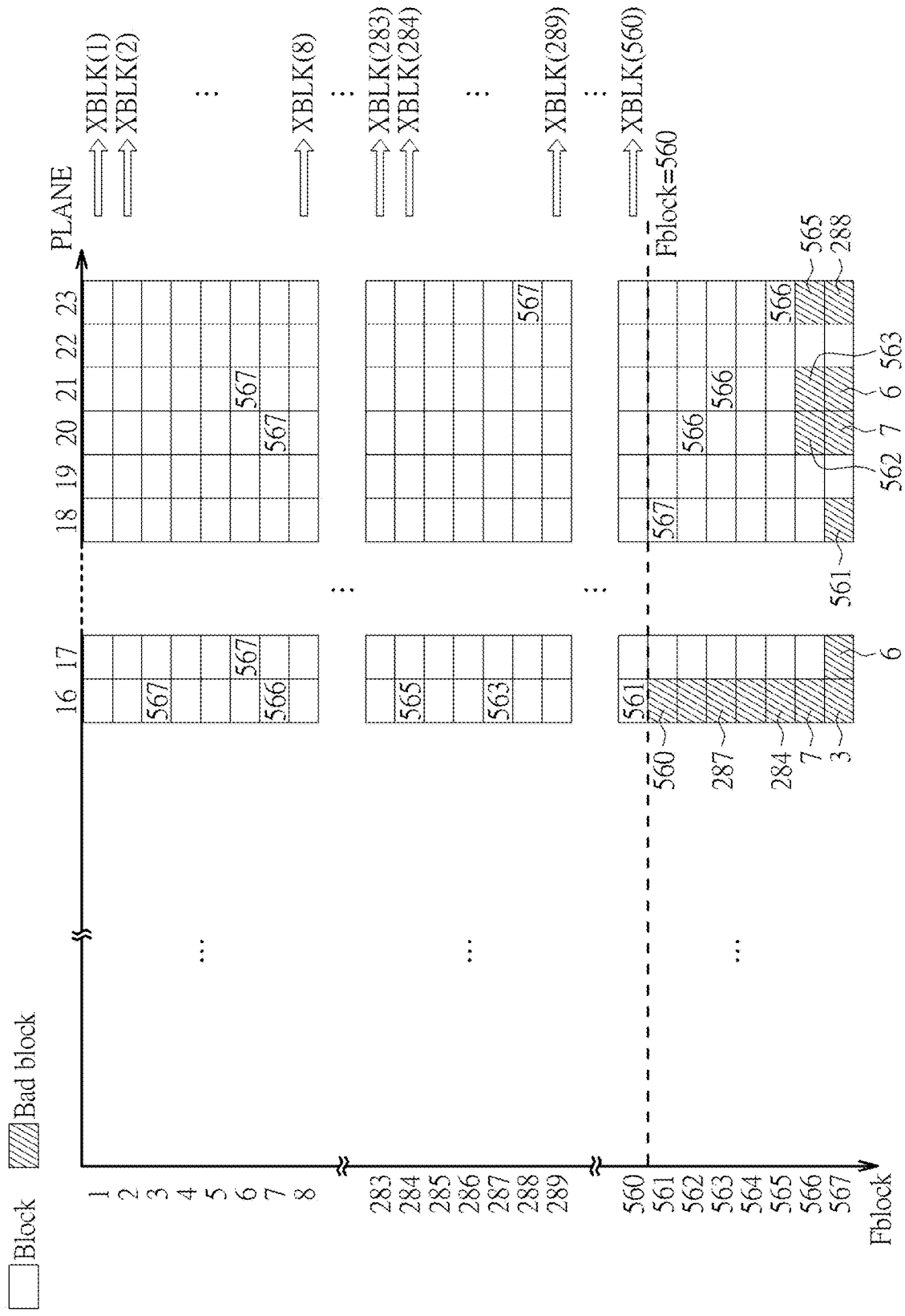
FIG. 3C is a diagram illustrating some other implementation details of the example of block combinations after the replacement processing of the block replacement control scheme.

FIG. 3A is a diagram illustrating an example of bad block distribution before replacement processing of a block replacement control scheme, FIG. 3B is a diagram illustrating some implementation details of an example of block combinations after the replacement processing of the block replacement control scheme, and FIG. 3C is a diagram illustrating some other implementation details of the example of block combinations after the replacement processing of the block replacement control scheme, wherein shaded blocks may represent damaged blocks such as bad blocks, and unshaded blocks may represent non-damaged blocks such as good blocks, but the present invention is not limited thereto. In some embodiments, block combinations shown in FIG. 3B and FIG. 3C and bad block distribution shown in FIG. 3A may vary.

The memory controller 110 may perform the at least one test procedure to detect any bad block BLK(k) of any global plane PLANE (e.g., any plane PL(j) of any channel CH(i)), and select a good block in the same global plane PLANE to replace the bad block BLK(k). As shown in FIG. 3B and FIG. 3C, any good block marked with the numbers of the physical blocks Fblock (e.g., any of {1, 2, . . . , 567}) may represent a replacement block, and the replacement block is arranged to replace a bad block belonging to the same plane. Take PLANE=1 as an example. The memory controller 110 may utilize a good block (e.g., a block corresponding to Fblock=567 in FIG. 3A) to replace a bad block (e.g., a block corresponding to Fblock=564 in FIG. 3A), so that the good block becomes a replacement block (e.g., a block marked with 567 at a coordinate (PLANE=1, Fblock=564) in FIG. 3B) for replacing the bad block (e.g., a block marked with 564 at a coordinate (PLANE=1, Fblock=567) in FIG. 3B). In addition, take PLANE=23 as an example. The memory controller 110 may utilize a first good block (e.g., a block corresponding to Fblock=567 in FIG. 3A) to replace a first bad block (e.g., a block corresponding to Fblock=288 in FIG. 3A), so that the first good block becomes a first replacement block (e.g., a block marked with 567 at a coordinate (PLANE=23, Fblock=288) in FIG. 3C) for replacing the first bad block (e.g., a block marked with 288 at a coordinate (PLANE=23, Fblock=567) in FIG. 3C). In addition, the memory controller 110 may utilize a second good block (e.g., a block corresponding to Fblock=566 in FIG. 3A) to replace a second bad block (e.g., a block corresponding to Fblock=565 in FIG. 3A), so that the second good block becomes a second replacement block (e.g., a block marked with 566 at a coordinate (PLANE=23, Fblock=565) in FIG. 3C) for replacing the second bad block (e.g., a block marked with 565 at a coordinate (PLANE=23, Fblock=566) in FIG. 3C). The rest may be deduced by analogy.

Based on the block replacement control scheme, the memory controller 110 may perform the replacement processing, and more particularly, may record physical addresses of all bad blocks {BLK(k)} and physical addresses of corresponding replacement blocks {BLK(k)}

(e.g., good blocks {BLK(k)} that replace the bad blocks {BLK(k)}, respectively) into the at least one BR management table for indicating that the replacement blocks {BLK (k)} replace the bad blocks {BLK(k)}, so that the operations of accessing the bad blocks {BLK(k) are changed into the operations of accessing the replacement blocks {BLK(k)}. The memory controller 110 may combine blocks {BLK(k)} corresponding to the block index k in all global planes {PLANE} (e.g., all planes {PL(j)} of all channels {CH(i)}) into a superblock XBLK(k) corresponding to the same block index k, to simultaneously access these blocks {BLK(k)} in the superblock XBLK(k) by the same block address BLK_Add (k). In this way, the memory controller 110 may simultaneously access all blocks {BLK(k)} of any superblock XBLK(k) among multiple superblocks {XBLK(k)} (e.g., 560 superblocks {XBLK(k)|k=1, 2, . . . , 560}), to achieve the maximum throughput. Since the memory controller 110 may utilize the multiple superblocks {XBLK(k)} (e.g., the 560 superblocks {XBLK(k)|k=1, 2, . . . , 560}) to achieve the maximum throughput, the region of the multiple superblocks {XBLK(k)} (e.g., the region above the dotted line marked with Fblock=560 in FIG. 3B and FIG. 3C) may be regarded as a maximum throughput superblock region.

As shown in FIG. 3B and FIG. 3C, the memory controller 110 may maximize the maximum throughput superblock region to improve the overall performance, but the present invention is not limited thereto. For example, the NV memory 120 may be implemented by a 3D NAND type flash memory. Under a condition that flash memory manufacturers try to increase storage capacity by increasing the 3D NAND type flash stack architecture, the process yield may decrease and/or a number of damaged blocks in any global plane PLANE (e.g., any plane PL(j) of any channel CH(i)) may increase, which may cause the memory device 100 using the 3D NAND type flash memory as the NV memory 120 to fail tests regarding sufficient storage capacity. The memory controller 110 may operate according to one or more control schemes to avoid maximizing the maximum throughput superblock region, in order to achieve both requirements of storage capacity specifications and data access performance improvement.

Figure 4:
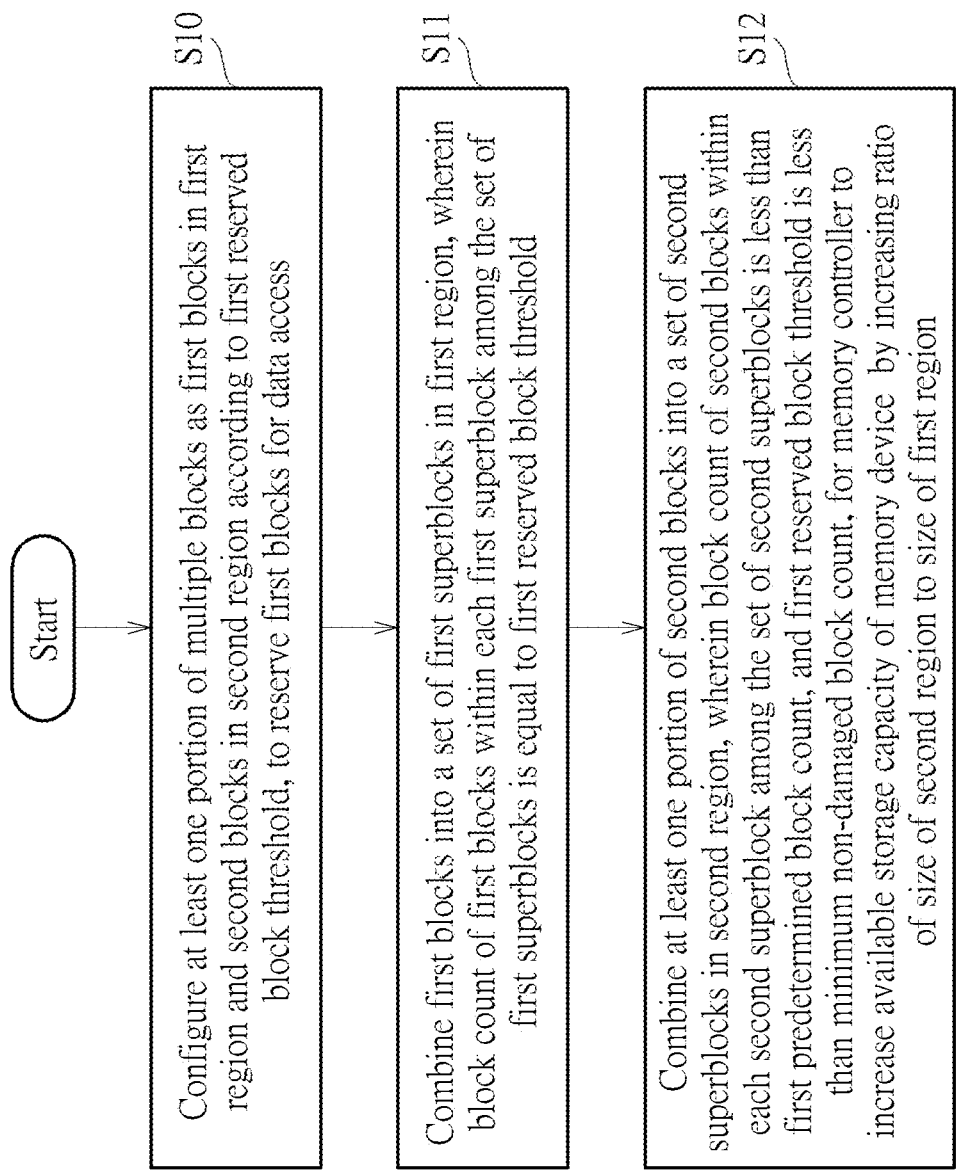
FIG. 4 is a flow chart of a method for performing storage space management of a memory device with aid of dynamic block configuration according to an embodiment of the present invention.

FIG. 4 is a flow chart of a method for performing storage space management of a memory device with aid of dynamic block configuration according to an embodiment of the present invention. Any block BLK in the multiple blocks {BLK} of the NV memory 120 may belong to a plane among multiple planes (e.g., the global planes {PLANE}, such as all planes {PL(j)} of all channels {CH(i)}) of the at least one NV memory element, to allow the memory controller 110 to configure blocks {BLK(k)} that belong to the multiple planes, respectively (e.g., blocks {BLK(k)} corresponding to the block index k in all planes {PL(j)} of all channels {CH(i)}), as a corresponding superblock XBLK (k).

In Step S10, the memory controller 110 may configure at least one portion of the multiple blocks {BLK} as multiple first blocks {BLK(k)|k=1, . . . , Fb1} in a first region and multiple second blocks {BLK(k)|k=(Fb1+1), . . . , $Fblock_{MAX}$} in a second region (e.g., the multiple first blocks {BLK(k)|k=1, . . . , Fb1} of the multiple planes and the multiple second blocks {BLK(k)|k=(Fb1+1), . . . , $Fblock_{MAX}$} of the multiple planes) according to a first reserved block threshold Reserved_BLK_Th(1), to reserve the multiple first blocks {BLK(k)|k=1, . . . , Fb1} for data access (e.g., data access corresponding to a first target performance), wherein the multiple first blocks {BLK (k)|k=1, . . . , Fb1} of the multiple planes may include (CNT_CH*CNT_PL*Fb1) blocks {BLK(k)}, the multiple second blocks {BLK(k)|k=(Fb1+1), . . . , $Fblock_{Max}$} of the multiple planes may include (CNT_CH*CNT_PL* ($Fblock_{MAX}$–Fb1)) blocks {BLK(k)}, and $Fblock_{MAX}$=CNT_BLK. For example, the first target performance may represent the maximum throughput of the memory device 100 regarding data access. In addition, the at least one portion of the multiple blocks {BLK} may represent non-damaged blocks among the multiple blocks {BLK}, rather than damaged blocks.

In Step S11, the memory controller 110 may combine the multiple first blocks {BLK(k)|k=1, . . . , Fb1} of the multiple planes into a set of first superblocks {XBLK(k)|k=1, . . . , Fb1} in the first region, wherein a block count of first blocks {BLK(k)} within each first superblock XBLK(k) among the set of first superblocks {XBLK(k)|k=1, . . . , Fb1} is equal to a first predetermined block count (e.g., a total plane count $PLANE_{MAX}$ of the global planes {PLANE}), and a superblock count Fb1 of the set of first superblocks {XBLK (k)|k=1, . . . , Fb1} is equal to the first reserved block threshold Reserved_BLK_Th(1).

In Step S12, the memory controller 110 may combine at least one portion of second blocks {BLK(k)|k= (Fb1+1), . . . , (Fb1+ΔFb)} in the multiple second blocks {BLK(k)|k=(Fb1+1), . . . , $Fblock_{MAX}$} of the multiple planes into a set of second superblocks {XBLK(k)|k=(Fb1+ 1), . . . , (Fb1+ΔFb)} in the second region, wherein a block count of second blocks {BLK(k)} within each second superblock XBLK (k) among the set of second superblocks {XBLK(k)|k=(Fb1+1), . . . , (Fb1+ΔFb)} is less than the first predetermined block count (e.g., the total plane count $PLANE_{MAX}$), and the first reserved block threshold Reserved_BLK_Th(1) is less than the minimum non-damaged block count Fb0 among respective non-damaged block counts of the multiple planes (e.g., the global planes {PLANE}), for the memory controller 110 to increase an available storage capacity of the memory device 100 by increasing a ratio of a size of the second region to a size of the first region. For example, the memory controller 110 may determine the first reserved block threshold Reserve_ BLK_Th(1) to be less than the minimum non-damaged block count Fb0 and greater than or equal to a default value $Fb_{DEFAULT}$, to control a performance-guaranteed storage capacity of the memory device 100 (e.g., a storage capacity of the set of first superblocks {XBLK(k)|k=1, . . . , Fb1} in the first region) to be greater than or equal to a predetermined performance-guaranteed storage capacity (e.g., a storage capacity of $Fb_{DEFAULT}$ first superblocks {XBLK (k)|k=1, . . . , $Fb_{DEFAULT}$} in the first region), for performing data access corresponding to the first target performance (e.g., the maximum throughput), wherein the default value $Fb_{DEFAULT}$ may be less than or equal to a predetermined value of the superblock count Fb1.

The memory controller 110 may determine the first reserved block threshold Reserved_BLK_Th(1) according to a reserved block threshold default setting, but the present invention is not limited thereto. For example, the memory controller 110 may determine the first reserved block threshold Reserved_BLK_Th(1) according to any of the reserved block threshold default setting and a reserved block threshold user setting. For another example, the memory controller 110 may determine the reserved first block threshold Reserved_BLK_Th(1) according to a statistical result of the multiple blocks {BLK}, wherein the statistical result may include a combination or one of a damaged block statistical result (e.g., a bad block statistical result indicating the bad block distribution in FIG. 3B and FIG. 3C), a non-damaged block statistical result (e.g., a good block statistical result indicating the good block distribution in FIG. 3B and FIG. 3C), the minimum non-damaged block count Fb0 among respective non-damaged block counts of the multiple planes (e.g., the global planes {PLANE}), and the maximum damaged block count (Fblock$_{MAX}$–Fb0) among respective damaged block counts of the multiple planes (e.g., the global planes {PLANE}). Typically, when the damaged blocks exist in the multiple blocks {BLK} (e.g., when the NV memory 120 is implemented by the 3D NAND type flash memory), since the number of damaged blocks may be very large, there is no need to combine all non-damaged blocks into the superblocks. As long as the implementation of the present invention is not hindered, the memory controller 110 may determine the first reserved block threshold Reserved_BLK_Th(1) in any of the above-mentioned ways. In addition, the memory controller 110 may control the superblock count Fb1 of the set of first superblocks {XBLK(k)|k=1, . . . , Fb1} to be equal to the first reserved block threshold Reserved_BLK_Th(1), rather than a maximum available reserved block threshold Reserved_BLK_Th(0), to increase the second superblock count in the second region by increasing the second block count in a plane PLANE with the minimum non-damaged block count Fb0, for increasing the available storage capacity and/or balancing the performance-guaranteed storage capacity of the memory device 100 (e.g., the storage capacity of the set of first superblocks {XBLK(k)|k=1, . . . , Fb1} in the first region) and the available storage capacity, wherein the maximum available reserved block threshold Reserved_BLK_Th(0) may represent the minimum non-damaged block count Fb0.

Figure 5:
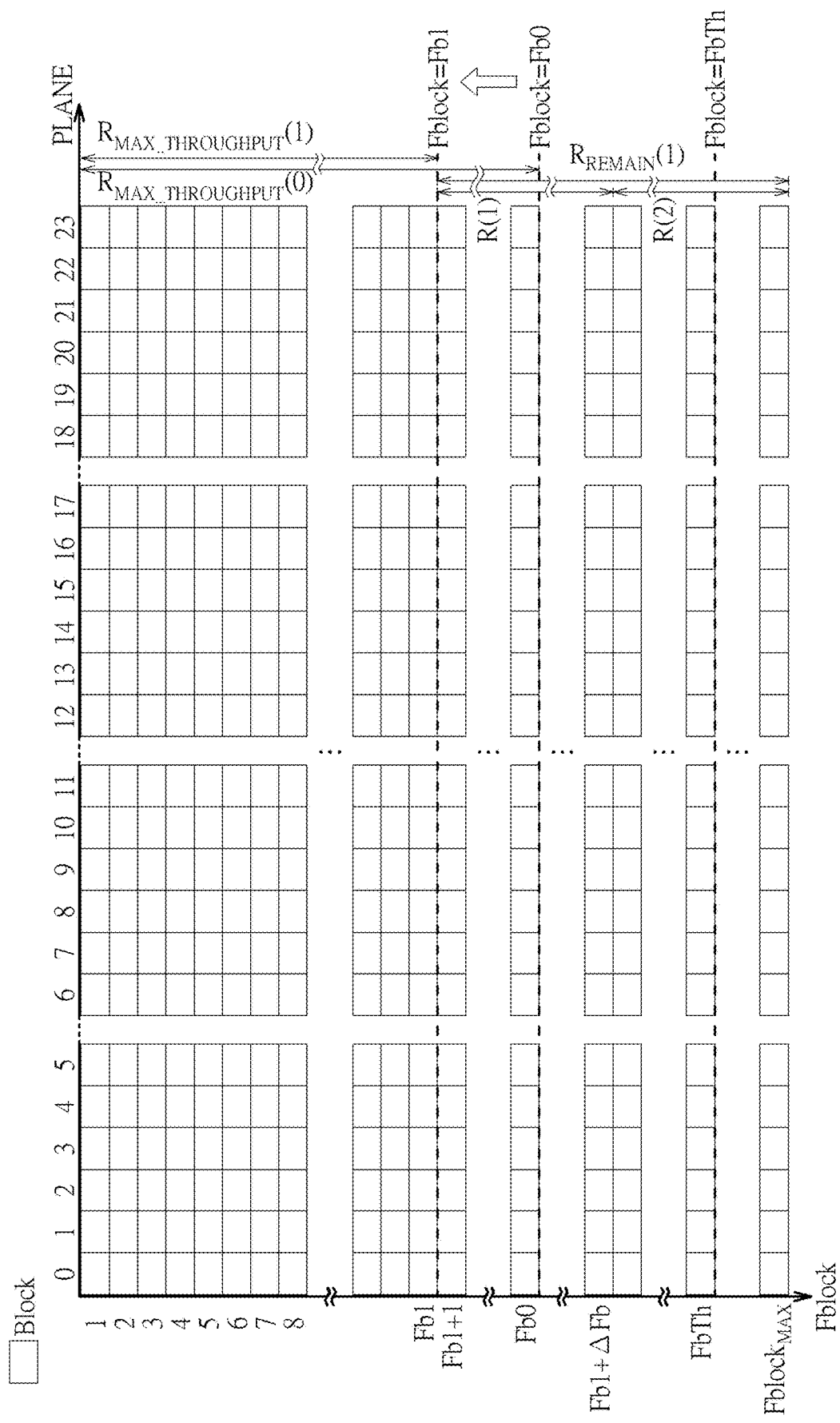
FIG. 5 is a diagram illustrating a storage space increment control scheme of the method according to an embodiment of the present invention.

FIG. 5 is a diagram illustrating a storage space increment control scheme of the method according to an embodiment of the present invention. For better comprehension, the memory controller 110 may operate according to a first storage capacity setting (e.g., a maximum throughput superblock region maximization setting), and more particularly, may utilize multiple superblocks {XBLK(k)} (e.g., Fb0 superblocks {XBLK(k)|k=1, 2, . . . , Fb0}) to achieve the maximum throughput, wherein the region of the multiple superblocks {XBLK(k)} (e.g., the region above the dotted line marked with Fblock=Fb0) may be regarded as a maximum throughput superblock region R$_{MAX\_THROUGHPUT}$(0), but the present invention is not limited thereto. Take the block combination shown in FIG. 3B and FIG. 3C as an example. When Fb0=560, the memory controller 110 may utilize the 560 superblocks {XBLK(k)|k=1, 2, . . . , 560} to achieve the maximum throughput, and the region of the 560 superblocks {XBLK(k)|k=1, 2, . . . , 560} (e.g., the region above the dotted line marked with Fblock=560 in FIG. 3B and FIG. 3C) may be regarded as the maximum throughput superblock region R$_{MAX\_THROUGHPUT}$(0).

In addition, the memory controller 110 may operate according to a second storage capacity setting (e.g., a maximum throughput superblock region non-maximization setting), to increase the available storage capacity and/or balance the performance-guaranteed storage capacity and the available storage capacity. For example, when Reserved_BLK_Th(0)=Fb0 and Reserved_BLK_Th(1)=Fb1, the memory controller 110 may control the first region to be a maximum throughput superblock region R$_{MAX\_THROUGHPUT}$(1) corresponding to the first reserved block threshold Reserved_BLK_Th(1), rather than the maximum throughput superblock region R$_{MAX\_THROUGHPUT}$(0) corresponding to the maximum available reserved block threshold Reserved_BLK_Th(0), in order to configure more second superblocks {XBLK(k)} in the second region (e.g., a remaining region R$_{REMAIN}$(1)). The set of first superblocks {XBLK(k)|k=1, . . . , Fb1} in the maximum throughput superblock region R$_{MAX\_THROUGHPUT}$(1) may represent superblocks corresponding to the plane count per superblock Plane_CNT_per_SB(1), and the set of second superblocks {XBLK(k)|k=(Fb1+1), . . . , (Fb1+ΔFb)} in the remaining region R$_{REMAIN}$(1) may represent superblocks corresponding to the plane count per superblock Plane_CNT_per_SB(2), wherein Plane_CNT_per_SB(1)=PLANE$_{MAX}$, and Plane_CNT_per_SB(2)=(Plane_CNT_per_SB(1)–1)=(PLANE$_{MAX}$–1).

Take the distribution of bad blocks with respect to the global plane PLANE after the replacement processing is completed in FIG. 3B and FIG. 3C as an example. When PLANE=16, the damaged block count (or the bad block count) reaches its maximum value. Under this situation, the memory controller 110 may combine the second blocks {BLK(k)|k=561, . . . , 564} of the global planes {PLANE(p)|p=0, . . . , 15, 17, . . . , 23} into the second superblocks {XBLK(k)|k=561, . . . , 564}, without utilizing 4 bad blocks at coordinates {(PLANE=16, Fblock=561), . . . , (PLANE=16, Fblock=564)}, for performing data access corresponding to a second target performance (e.g., a smaller throughput). In some embodiments, in order to obtain more storage spaces, the memory controller 110 may combine the second blocks {BLK(k)|k=565} of the global planes {PLANE(p)|p=0, 1, 3, 5, . . . , 15, 17, . . . , 23} into a second superblock XBLK (565), without utilizing 3 bad blocks at coordinates {(PLANE=2, Fblock=565), (PLANE=4, Fblock=565), (PLANE=16, Fblock=565)} (wherein the rest may be deduced by analogy, and the throughput may become smaller), but the present invention is not limited thereto. Based on the storage space increment control scheme, the memory controller 110 may control the first region as the maximum throughput superblock region R$_{MAX\_THROUGHPUT}$(1) corresponding to the first reserved block threshold Reserved_BLK_Th(1), to configure more second superblocks {XBLK(k)} in the remaining region R$_{REMAIN}$(1), for performing data access corresponding to the second target performance (e.g., the smaller throughput). For example, regarding the distribution of bad blocks with respect to the global plane PLANE after the replacement processing is completed in FIG. 3B and FIG. 3C, the memory controller 110 may reserve good blocks at coordinates {(PLANE=16, Fblock=(Fb1+1)), . . . , (PLANE=16, Fblock=560)} for configuring as the superblock corresponding c superblock Plane_CNT_per_SB(2), rather than the superblock corresponding to the plane count per superblock Plane_CNT_per_SB(1).

After the replacement processing is completed, the memory controller 110 may perform a re-replacement processing upon the second region (e.g., the remaining region R$_{REMAIN}$(1)) to re-arrange at least one portion of bad blocks {BLK(k)} within the second region, and more particularly, may sequentially re-arrange the at least one portion of bad blocks {BLK(k)} as a block arrangement pattern with only one bad block in each column (or each vertical position of the integer coordinate system (PLANE, Fblock), along the Fblock axis), for configuring as the superblock corresponding to the plane count per superblock Plane_CNT_per_SB(2). The at least one portion of bad blocks {BLK(k)} may represent bad blocks {BLK(k)} corresponding to Fblock=FbTh or Fblock<FbTh in the remaining region R$_{REMAIN}$(1), such as all bad blocks {BLK(k)} in the blocks {BLK(k)|k=(Fb1+1), . . . , FbTh} of the multiple planes (e.g., the global planes {PLANE}), wherein the memory controller 110 may select bad blocks {BLK(k)} corresponding to Fblock≤FbTh from bad blocks {BLK(k)} within the remaining region R$_{REMAIN}$(1) as the at least one portion of bad blocks {BLK(k)}. For example, assume that FbTh=566. The memory controller 110 may re-arrange bad blocks at coordinates {(PLANE=2, Fblock=565), (PLANE=2, Fblock=566), (PLANE=4, Fblock=565), (PLANE=4, Fblock=566), (PLANE=15, Fblock=566)} in FIG. 3B to coordinates {(PLANE=2, Fblock=(Fb1+1)), (PLANE=2, Fblock=(Fb1+2)), (PLANE=4, Fblock=(Fb1+3)), (PLANE=4, Fblock=(Fb1+4)), (PLANE=15, Fblock=(Fb1+5))}, respectively, and may re-arrange bad blocks at coordinates {(PLANE=16, Fblock=561), . . . , (PLANE=16, Fblock=566), (PLANE=20, Fblock=566), (PLANE=21, Fblock=566), (PLANE=23, Fblock=566)} in FIG. 3C to coordinates {(PLANE=16, Fblock=(Fb1+6)), . . . , (PLANE=16, Fblock=(Fb1+11)), (PLANE=20, Fblock=(Fb1+12)), (PLANE=21, Fblock=(Fb1+13)), (PLANE=23, Fblock=(Fb1+14))}, respectively, but the present invention is not limited thereto. According to some embodiments, the block arrangement pattern may vary.

As shown in FIG. 5, the second region (e.g., the remaining region $R_{REMAIN}(1)$) may include multiple sub-regions (e.g., sub-regions R(1) and R(2)). The memory controller 110 may determine a boundary between the sub-regions R(1) and R(2) according to any of a sub-region boundary default setting and a sub-region boundary user setting, but the present invention is not limited thereto. For example, the memory controller 110 may determine the boundary between the sub-regions R(1) and R(2) according to the statistical result of the multiple blocks {BLK}, and more particularly, may determine a bad block selection threshold FbTh according to the statistical result of the multiple blocks {BLK}, and select the bad blocks {BLK(k)} corresponding to Fblock≤FbTh from the bad blocks {BLK(k)} within the remaining region $R_{REMAIN}(1)$ as the at least one portion of bad blocks {BLK(k)} according to the bad block selection threshold FbTh, for performing the re-replacement processing and determining the boundary between the sub-regions R(1) and R(2). Assume that the at least one portion of bad blocks {BLK(k)} includes ΔFb bad blocks. After performing the re-replacement processing to sequentially re-arrange the at least one portion of bad blocks {BLK(k)} as the block arrangement pattern with only one bad block in each column, the memory controller 110 may obtain ΔFb columns of good blocks {BLK(k)}, such as good blocks {BLK(k)|k=(Fb1+1), . . . , (Fb1+ΔFb)} that correspond to Fblock=(Fb1+1), . . . , and Fblock=(Fb1+ΔFb), respectively, wherein each column of good blocks {BLK(k)} has ($PLANE_{MAX}$−1) good blocks {BLK(k)} of ($PLANE_{MAX}$−1) planes for acting as the at least one portion of second blocks {BLK(k)|k=(Fb1+1), . . . , (Fb1+ΔFb)}. In this way, the memory controller 110 may combine the ΔFb columns of good blocks {BLK(k)} within the remaining region $R_{REMAIN}(1)$ to generate the superblock corresponding to the plane count per superblock Plane_CNT_per_SB(2), for acting as the set of second superblocks {XBLK(k)|k=(Fb1+1), . . . , (Fb1+ΔFb)} located in the sub-region R(1), wherein the memory controller 110 may reserve good blocks {BLK(k)} in the sub-region R(2) for other processing, without re-arranging bad blocks {BLK(k)} in the sub-region R(2). Under a condition that a total bad block count of the multiple blocks {BLK} is very large, there may be a large number of bad blocks {BLK(k)} in the sub-region R(2), and the bad block selection threshold FbTh may be close to the boundary between the sub-regions R(1) and R(2), such as Fb0=(Fb1+ΔFb), but the present invention is not limited thereto. In addition, the block arrangement pattern may change with the statistical result of the multiple blocks {BLK}, and/or may correspondingly change with the change of the bad block count ΔFb of the at least one portion of bad blocks {BLK(k)}.

Based on the storage space increment control scheme, the memory controller 110 may utilize the second blocks {BLK(k)} in the plane PLANE with the minimum non-damaged block count Fb0 as a margin for configuring the set of second superblocks {XBLK(k)|k=(Fb1+1), . . . , (Fb1+ΔFb)}, but the present invention is not limited thereto. According to some embodiments, the memory controller 110 may utilize the second blocks {BLK(k)} in the plane PLANE with the minimum non-damaged block count Fb0 as a margin for configuring one or more additional second superblocks {XBLK(k)} in the second region (e.g., the remaining region $R_{REMAIN}(1)$), wherein a block count of the second blocks {BLK(k)} within each of the one or more additional second superblocks {XBLK(k)} is less than the first predetermined block count (e.g., the total plane count $PLANE_{MAX}$). For example, the at least one NV memory element may represent the NV memory elements 122-1, 122-2, . . . , and 122-$N_E$. Any block BLK in the multiple blocks {BLK} may belong to a plane PL(j) in the multiple planes {PL(j)} of one of the NV memory elements 122-1, 122-2, . . . , and 122-$N_E$, to allow the memory controller 110 to configure the blocks {BLK(k)} that belong to the multiple planes (e.g., the global planes {PLANE}), respectively, as the corresponding superblock XBLK(k), for achieving the first target performance (e.g., the maximum throughput) by simultaneous access. For brevity, similar descriptions for these embodiments are not repeated in detail here.

Figure 6A:
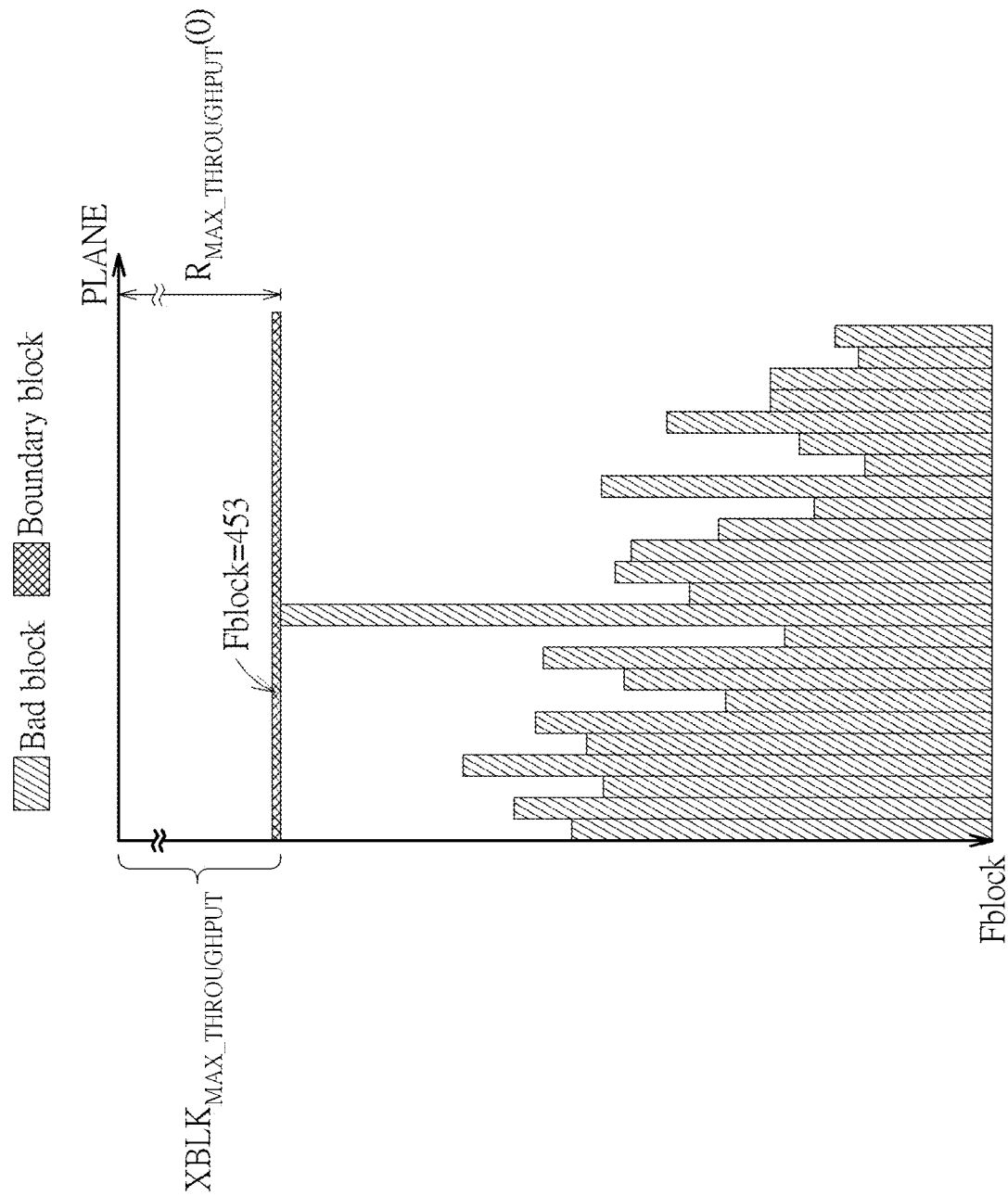
FIG. 6A is a diagram illustrating an example of a set of original boundary blocks in the storage space increment control scheme.
Figure 6B:
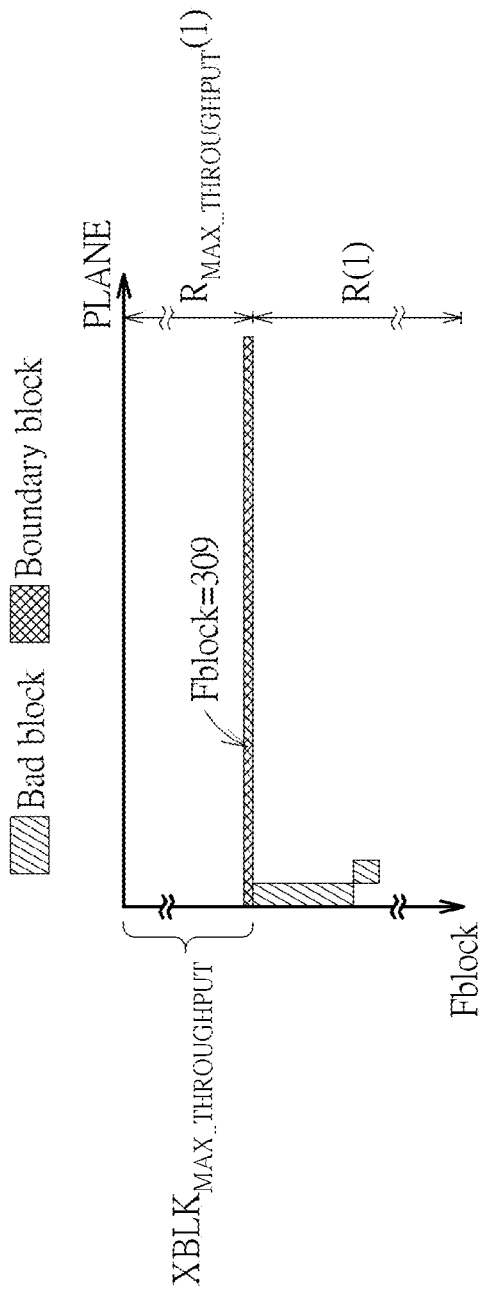
FIG. 6B is a diagram illustrating an example of a set of first boundary blocks in the storage space increment control scheme.
Figure 6C:
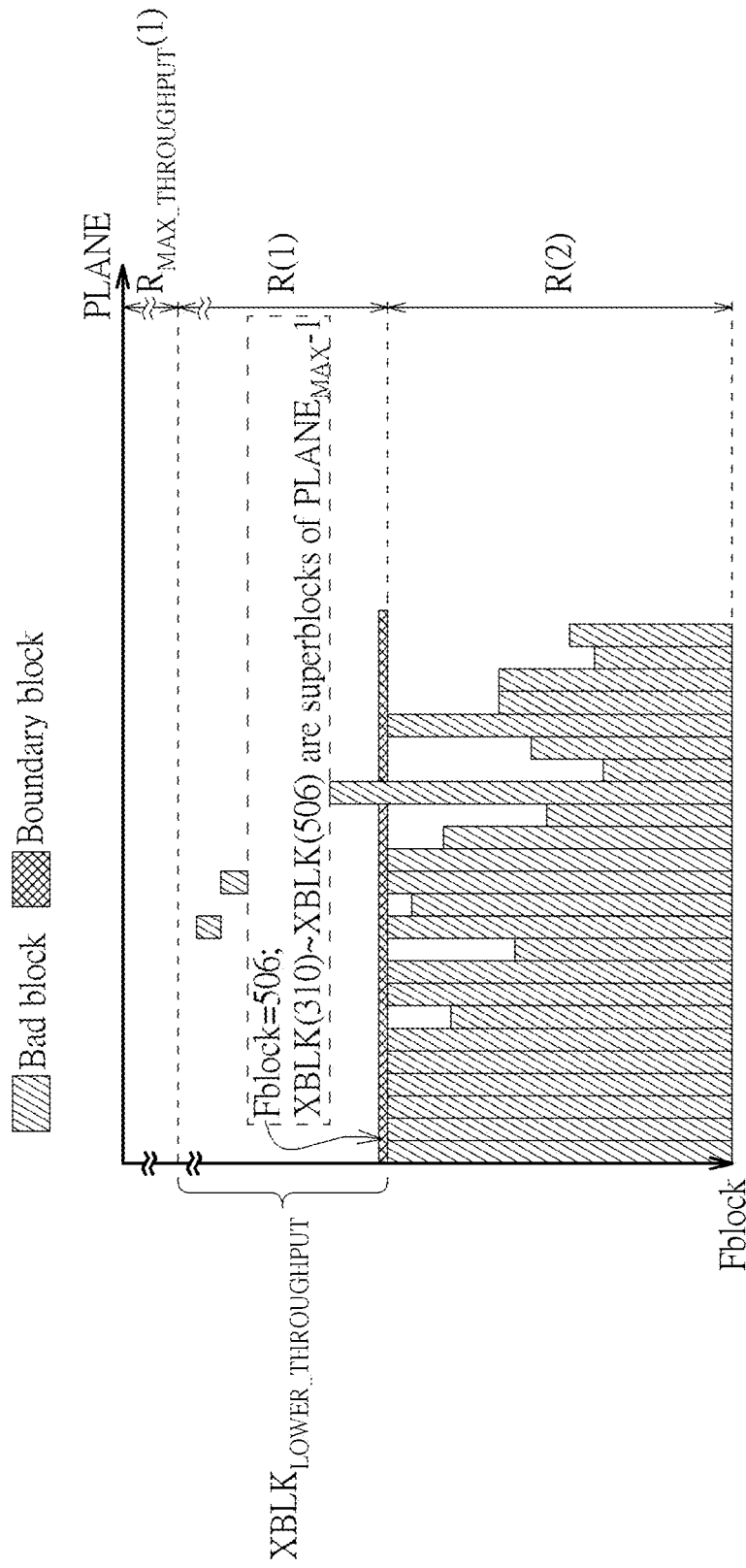
FIG. 6C is a diagram illustrating an example of a set of second boundary blocks in the storage space increment control scheme.
Figure 6D:
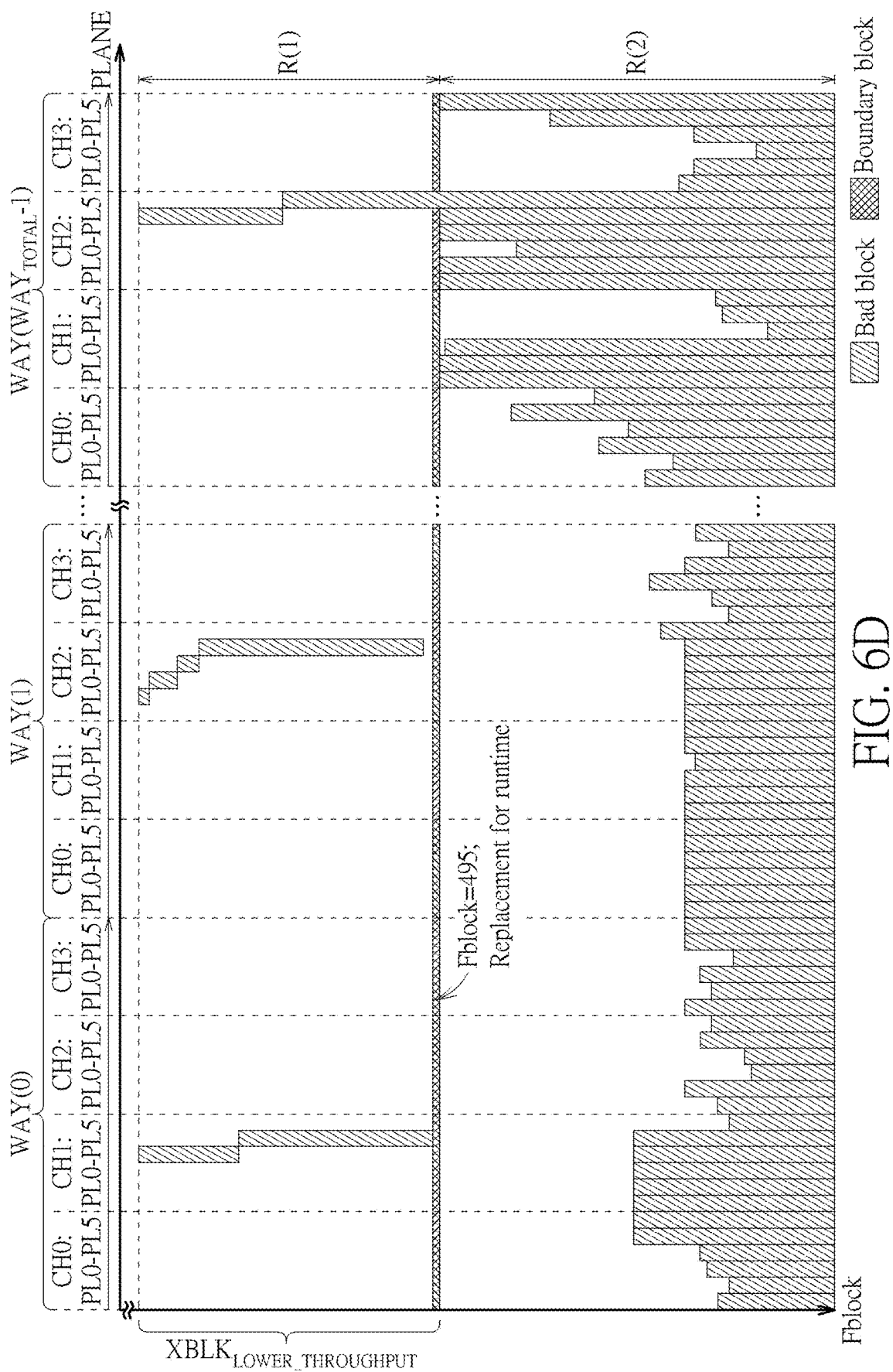
FIG. 6D is a diagram illustrating an example of another set of boundary blocks in the storage space increment control scheme.

FIG. 6A is a diagram illustrating an example of a set of original boundary blocks in the storage space increment control scheme, FIG. 6B is a diagram illustrating an example of a set of first boundary blocks in the storage space increment control scheme, FIG. 6C is a diagram illustrating an example of a set of second boundary blocks in the storage space increment control scheme, and FIG. 6D is a diagram illustrating an example of another set of boundary blocks in the storage space increment control scheme. For better comprehension, assume that Fb0=453, Fb1=309, and the boundary between the sub-regions R(1) and R(2) may be a boundary between blocks {BLK(506)} corresponding to Fblock=506 and blocks {BLK(507)} corresponding to Fblock=507 (as shown in FIG. 6A, FIG. 6B, and FIG. 6C), but the present invention is not limited thereto. For example, the minimum non-damaged block count Fb0, the superblock count Fb1, and/or the boundary between the sub-regions R(1) and R(2) may vary.

In FIG. 6A, the set of original boundary blocks before boundary adjustment may be blocks {BLK(453)} corresponding to Fblock=453. Under this condition, the memory controller 110 may configure 453 superblocks {XBLK(1), . . . , XBLK(453)} corresponding to the plane count per superblock Plane_CNT_per_SB (1) as maximum throughput superblocks {$XBLK_{MAX\_THROUGHPUT}$} with the maximum throughput (regarding data access), wherein the blocks {BLK(453)} may be regarded as boundary blocks of the maximum throughput superblock region $R_{MAX\_THROUGHPUT}(0)$ including the maximum throughput superblocks {$XBLK_{MAX\_THROUGHPUT}$}. For example, the plane count per superblock Plane_CNT_per_SB(1) may be equal to the total plane count $PLANE_{MAX}$ of the global planes {PLANE}. Take the respective planes {PL0, PL1, PL2, PL3, PL4, PL5} of the channels {CH0, CH1, CH2, CH3} shown in FIG. 2 as an example. The channel count CNT_CH of the channels {CH0, CH1, CH2, CH3} is equal to 4, and the plane count CNT_PL of the planes {PL0, PL1, PL2, PL3, PL4, PL5} within any channel CH(i) among the channels {CH0, CH1, CH2, CH3} is equal to 6. As a result, Plane_CNT_per_SB(1)=PLANE$_{MAX}$=(CNT_CH*CNT_PL)=(4*6)=24.

In FIG. 6B, the set of first boundary blocks after boundary adjustment may be blocks {BLK(309)} corresponding to Fblock=309. Under this condition, the memory controller 110 may configure 309 superblocks {XBLK(1), . . . , XBLK(309)} corresponding to the plane count per superblock Plane_CNT_per_SB(1) as the maximum throughput superblocks {XBLK$_{MAX\_THROUGHPUT}$} with the maximum throughput (regarding data access), wherein the blocks {BLK(309)} may be regarded as boundary blocks of the maximum throughput superblock region R$_{MAX\_THROUGHPUT}$(1) including the maximum throughput superblocks {XBLK$_{MAX\_THROUGHPUT}$}. For example, the plane count per superblock Plane_CNT_per_SB(1) may be equal to the total plane count PLANE$_{MAX}$. Take the respective planes {PL0, PL1, PL2, PL3, PL4, PL5} of the channels {CH0, CH1, CH2, CH3} shown in FIG. 2 as an example. Plane_CNT_per_SB(1)=PLANE$_{MAX}$=(CNT_CH*CNT_PL)=(4*6)=24.

In FIG. 6C, the set of second boundary blocks after the re-replacement processing may be blocks {BLK(506)} corresponding to Fblock=506. As shown in FIG. 6B and FIG. 6C, after the re-replacement processing is performed, the memory controller 110 may configure 197 superblocks {XBLK(310), . . . , XBLK(506)} corresponding to the plane count per superblock Plane_CNT_per_SB(2) as smaller throughput superblocks {XBLK$_{LOWER\_THROUGHPUT}$} with the smaller throughput, wherein the blocks {BLK(506)} may be regarded as boundary blocks of the sub-region R(1) including the smaller throughput superblocks {XBLK$_{LOWER\_THROUGHPUT}$}. For example, the plane count per superblock Plane_CNT_per_SB(2) may be equal to the total plane count PLANE$_{MAX}$ minus 1. Take the respective planes {PL0, PL1, PL2, PL3, PL4, PL5} of the channels {CH0, CH1, CH2, CH3} shown in FIG. 2 as an example. Plane_CNT_per_SB(2)=(PLANE$_{MAX}$-1)=(CNT_CH*CNT_PL-1)=(4*6-1)=23.

For better comprehension, the NV memory 120 may be equipped with internal configuration of one way, such as internal configuration of the multiple channels {CH(i)} (which have respective planes {PL(j)}, respectively). Related operations regarding this are mentioned above, but the present invention is not limited thereto. For example, the NV memory 120 may be equipped with internal configuration of more than one way, such as respective internal configuration of multiple ways WAY(Intlv)|Intlv=0, . . . , (WAY$_{TOTAL}$-1)}, and any way WAY(Intlv) among the multiple ways WAY(Intlv)|Intlv=0, . . . , (WAY$_{TOTAL}$-1)} may include multiple global planes {PLANE} (e.g., global planes {PLANE(p)|p=0, . . . , (PLANE$_{MAX}$-1)}) of the corresponding NV memory elements {122-$n$} (e.g., CNT_CH NV memory elements) on the multiple channels {CH(i)}. In this way, regarding the multiple ways {WAY(Intlv)| Intlv=0, . . . , (WAY$_{TOTAL}$-1)}, the memory controller 110 may perform similar operations according to the storage space increment control scheme, respectively, to obtain WAY$_{TOTAL}$ processing results. Since respective bad block distributions of the multiple ways {WAY(Intlv)|Intlv= 0, . . . , (WAY$_{TOTAL}$-1)} may be different from each other, the memory controller 110 may configure respective maximum throughput superblock regions {R$_{MAX\_THROUGHPUT}$(1)} of the multiple ways {WAY(Intlv) Intlv=0, . . . , (WAY$_{TOTAL}$-1)} to be the same as each other, and select the smallest sub-region R(1) from respective temporary sub-regions {R(1)} of the multiple ways {WAY(Intlv) Intlv=0, . . . , (WAY$_{TOTAL}$-1)} (which are indicated by the WAY$_{TOTAL}$ processing results), to configure each of the respective sub-regions {R(1)} of the multiple ways {WAY (Intlv)|Intlv=0, . . . , (WAY$_{TOTAL}$-1)} to be equal to the smallest sub-region R(1). As shown in FIG. 6D, after the re-placement processing for each way WAY(Intlv) among the multiple ways {WAY(Intlv)|Intlv=0, . . . , (WAY$_{TOTAL}$-1)} is performed, the memory controller 110 may configure the respective sub-regions {R(1)} of the multiple ways {WAY(Intlv)|Intlv=0, . . . , (WAY$_{TOTAL}$-1)} to be the same as each other, to make the other set of boundary blocks be blocks {BLK(495)} corresponding to Fblock=495. In addition, the memory controller 110 may reserve the good blocks {BLK(k)} in the sub-region R(2) for other processing (e.g., replacement for runtime).

Figure 7:
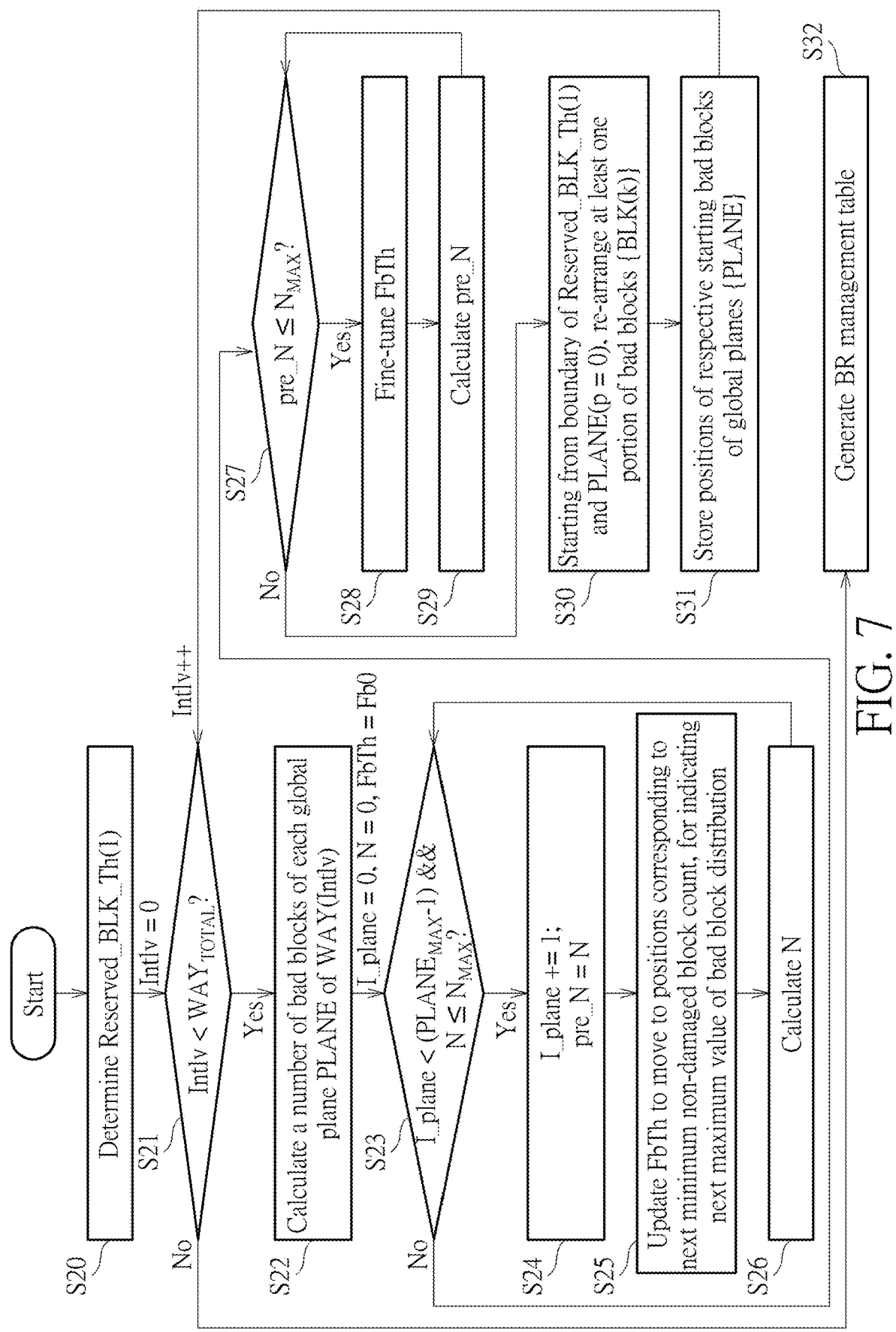
FIG. 7 is a diagram illustrating a working flow of a predetermined setting procedure of the method according to an embodiment of the present invention.

FIG. 7 is a diagram illustrating a working flow of a predetermined setting procedure of the method according to an embodiment of the present invention. The memory controller 110 may set an initial value of a way index Intlv of the multiple ways {WAY(Intlv)|Intlv=0, . . . , (WAY$_{TOTAL}$-1)} as 0 after executing Step S20, and increase the way index Intlv by a predetermined increment (e.g., 1) after executing at least one portion of Steps S21-S31 and before re-entering Step S21 (labeled as "Intlv++" for brevity), but the present invention is not limited thereto. For example, the operations of setting the initial value of the way index Intlv may be integrated into Step S20. In addition, after executing Step S22, the memory controller 110 may set initial values of a plane index I_plane, a bad block indicator N, and the bad block selection threshold FbTh, respectively, and more particularly, may set I_plane=0, N=0, and FbTh=Fb0, to select one of global planes {PLANE} (e.g., global planes {PLANE(p)|p=0, . . . , (PLANE$_{MAX}$-1)}) of a current way WAY(Intlv) as a target plane PLANE$_{TARGET}$(I_plane) in at least one loop including some subsequent steps for related operations, wherein FbTh=Fb0 represents moving the bad block selection threshold FbTh to positions corresponding to the minimum non-damaged block count Fb0 (e.g., positions corresponding to Fblock=560 in FIG. 3B and FIG. 3C) along the Fblock axis, for indicating the maximum value of the bad block distribution (e.g., the maximum damaged block count (Fblock$_{MAX}$-Fb0) among respective damaged block counts of global planes {PLANE} of the current way WAY(Intlv)).

In Step S20, the memory controller 110 may determine the first reserved block threshold Reserved_BLK_Th(1).

In Step S21, the memory controller 110 may determine whether the way index Intlv is less than a total way count WAY$_{TOTAL}$ of the multiple ways {WAY(Intlv)|Intlv=0, . . . , (WAY$_{TOTAL}$-1)}. If Yes (e.g., Intlv<WAY$_{TOTAL}$), Step S22 is entered; if No, Step S32 is entered.

In Step S22, the memory controller 110 may calculate a number of bad blocks {BLK} of each global plane PLANE among the global planes {PLANE} of the current way WAY(Intlv).

In Step S23, the memory controller 110 may determine whether the plane index I_plane is less than a difference value (PLANE$_{MAX}$-1) obtained by subtracting one from the total plane count PLANE$_{MAX}$, and may determine whether the bad block indicator N is less than or equal to a bad block indicator upper limit N$_{MAX}$ (labeled as "I_plane< (PLANE$_{MAX}$-1) && N≤N$_{MAX}$" for brevity). If Yes (e.g., I_plane<(PLANE$_{MAX}$-1) and N≤N$_{MAX}$), Step S24 is entered; if No, Step S27 is entered.

In Step S24, the memory controller 110 may update the plane index I_plane and a previous bad block indicator pre_N, such that the plane index I_plane is increased by an increment (e.g., 1) and the previous bad block indicator pre_N is equal to the bad block indicator N (labeled as "I_plane+=1" and "pre_N=N", respectively, for brevity).

In Step S25, the memory controller 110 may update the bad block selection threshold FbTh to make the bad block selection threshold FbTh move to positions corresponding to a next minimum non-damaged block count (e.g., for the first update starting from the minimum non-damaged block count Fb0, positions corresponding to Fblock=564 in FIG. 3B and FIG. 3C) along the Fblock axis, for indicating a next maximum value of the bad block distribution (e.g., a next maximum damaged block count among respective damaged block counts of global planes {PLANE} of the current way WAY(Intlv)). Take bad block distribution shown in FIG. 3B and FIG. 3C as an example:

(1) when I_plane=0, $\text{PLANE}_{TARGET}$(I_plane)=PLANE (p=16) and FbTh=Fb0=560, for indicating the maximum value of the bad block distribution (e.g., the first maximum value corresponding to a coordinate (PLANE=16, Fblock=560) or the bad block below the coordinate (PLANE=16, Fblock=560));
(2) when I_plane=1, $\text{PLANE}_{TARGET}$(I_plane)=PLANE (p=2) and FbTh=564, for indicating a next maximum value of the bad block distribution (e.g., the second maximum value corresponding to a coordinate (PLANE=2, Fblock=564) or the bad block below the coordinate (PLANE=2, Fblock=564));
(3) when I_plane=2, $\text{PLANE}_{TARGET}$(I_plane)=PLANE (p=4) and FbTh=564, for indicating a next maximum value of the bad block distribution (e.g., the third maximum value corresponding to a coordinate (PLANE=4, Fblock=564) or the bad block below the coordinate (PLANE=4, Fblock=564)), wherein the third maximum value may be equal to the second maximum value;
(4) when I_plane=3, $\text{PLANE}_{TARGET}$(I_plane)=PLANE (p=15) and FbTh=565, for indicating a next maximum value of the bad block distribution (e.g., the fourth maximum value corresponding to a coordinate (PLANE=15, Fblock=565) or the bad block below the coordinate (PLANE=15, Fblock=565));
(5) when I_plane=4, $\text{PLANE}_{TARGET}$(I_plane)=PLANE (p=20) and FbTh=565, for indicating a next maximum value of the bad block distribution (e.g., the fifth maximum value corresponding to a coordinate (PLANE=20, Fblock=565) or the bad block below the coordinate (PLANE=20, Fblock=565)), wherein the fifth maximum value may be equal to the fourth maximum value;
(6) when I_plane=5, $\text{PLANE}_{TARGET}$(I_plane)=PLANE (p=21) and FbTh=565, for indicating a next maximum value of the bad block distribution (e.g., the sixth maximum value corresponding to a coordinate (PLANE=21, Fblock=565) or the bad block below the coordinate (PLANE=21, Fblock=565)), wherein the sixth maximum value may be equal to the fifth maximum value; and
(7) when I_plane=6, $\text{PLANE}_{TARGET}$(I_plane)=PLANE (p=23) and FbTh=565, for indicating a next maximum value of the bad block distribution (e.g., the seventh maximum value corresponding to a coordinate (PLANE=23, Fblock=565) or the bad block below the coordinate (PLANE=23, Fblock=565)), wherein the seventh maximum value may be equal to the sixth maximum value;

wherein the rest may be deduced by analogy, but the present invention is not limited thereto.

In Step S26, the memory controller 100 may update or calculate the bad block indicator N (e.g., the bad block indicator N may be equal to a sum of a bad block count of bad blocks {BLK(k)} corresponding to Fblock≤FbTh and a candidate bad block count of candidate bad blocks {BLK(k)} corresponding to Fblock>FbTh in the bad block distribution), wherein the candidate bad blocks {BLK(k)} may include bad blocks {BLK(k)} corresponding to FbTh<Fblock≤FbTh2 in target planes {$\text{PLANE}_{TARGET}$(0), . . . , $\text{PLANE}_{TARGET}$(I_plane)} that have been checked at a current time point (e.g., a time point when Step S26 is executed), and "FbTh2" may represent a next level of the candidate value of the bad block selection threshold FbTh, for indicating a next level of the maximum value of the bad block distribution. Take the bad block distribution shown in FIG. 3B and FIG. 3C as an example:

(1) when I_plane=1, $\text{PLANE}_{TARGET}$(I_plane)=PLANE (p=2), FbTh=564, and FbTh2=565, wherein N=4+(1*(I_plane+1))=4+(1*2)=6;
(2) when I_plane=2, $\text{PLANE}_{TARGET}$(I_plane)=PLANE (p=4), FbTh=564, and FbTh2=565, wherein N=4+(1*(I_plane+1))=4+(1*3)=7;
(3) when I_plane=3, $\text{PLANE}_{TARGET}$(I_plane)=PLANE p=15), FbTh=565, and FbTh2=566, wherein N=7+(1*(I_plane+1))=7+(1*4)=11;
(4) when I_plane=4, $\text{PLANE}_{TARGET}$(I_plane)=PLANE (p=20), FbTh=565, and FbTh2=566, wherein N=7+(1*(I_plane+1))=7+(1*5)=12;
(5) when I_plane=5, $\text{PLANE}_{TARGET}$(I_plane)=PLANE (p=21), FbTh=565, and FbTh2=566, wherein N=7+(1*(I_plane+1))=7+(1*6)=13; and
(6) when I_plane=6, $\text{PLANE}_{TARGET}$(I_plane)=PLANE (p=23), FbTh=565, and FbTh2=566, wherein N=7+(1*(I_plane+1))=7+(1*7)=14;

wherein the rest may be deduced by analogy, but the present invention is not limited thereto.

For example, before executing a first loop including Steps S23-S26, the memory controller 110 may calculate a first predetermined value (e.g., a difference value (Fb0−Reserved_BLK_Th(1)) between the minimum non-damaged block count Fb0 and the first reserved block threshold Reserved_BLK_Th(1)) as the bad block indicator upper limit $N_{MAX}$ in Step S23, for controlling the executing condition of the first loop, but the present invention is not limited thereto. In another example, the memory controller 110 may preset an initial value of the bad block indicator upper limit $N_{MAX}$ as the first predetermined value before executing the first loop, and update the bad block indicator upper limit $N_{MAX}$ when the first loop is executed. More particularly, the memory controller 110 may obtain the latest bad block selection threshold FbTh at a first time point t1 (I_plane) after completing operations of Step S25, for acting as the latest bad block selection threshold FbTh(I_plane) corresponding to the plane index I_plane, and update the bad block indicator upper limit $N_{MAX}$ as a difference value (FbTh(I_plane)−Reserved_BLK_Th(1)) between the latest bad block selection threshold FbTh(I_plane) and the first reserved block threshold Reserved_BLK_Th(1) at any time point t in an interval [t1 (I_plane), t2 (I_plane)] between the first time point t1 (I_plane) and a second time point t2 (I_plane) of re-entering Step S23, for controlling the executing condition of the first loop. According to some embodiments, the calculation method of the bad block indicator N may vary, and the bad block indicator upper limit $N_{MAX}$ may change with the variation of the calculation method of the bad block indicator N. For example, before executing the first loop, the memory controller 110 may preset the initial value of the bad block indicator upper limit $N_{MAX}$ as the first predetermined value (e.g., the block count CNT_BLK or Fblock$_{MAX}$), and generate a bad block count estimation value $N_{EST}$(I_plane) according to the statistical result of the multiple blocks {BLK} to act as the bad block indicator N, for indicating a bad block count $N_{REAL}$(I_plane) to be included in estimated blocks {BLK(k)}, wherein the bad block count estimation value $N_{EST}$(I_plane) may correspond to the bad block count $N_{REAL}$(I_plane) (more particularly, may be $N_{FACTOR}$ times the bad block count $N_{REAL}$(I_plane)), and the bad block indicator upper limit $N_{MAX}$ in Step S23 may be replaced by Fblock$_{MAX}$ (e.g., $N_{FACTOR}$=(Fblock$_{MAX}$/$N_{MAX}$)), but the present invention is not limited thereto.

In Step S27, the memory controller 110 may determine whether the previous bad block indicator pre_N is less than or equal to the bad block indicator upper limit $N_{MAX}$ (labeled as "pre_N≤$N_{MAX}$" for brevity). If Yes (e.g., pre_N≤$N_{MAX}$), Step S28 is entered; if No, Step S30 is entered.

In Step S28, the memory controller 110 may fine-tune the bad block selection threshold FbTh, and more particularly, may increase the bad block selection threshold FbTh by an increment (e.g., 1, such as FbTh+=1) to make the bad block selection threshold FbTh move in the increasing direction along the Fblock axis, for trying to increase a number of bad blocks {BLK(k)} to be re-arranged during a second loop including Steps S27-S29, in order to increase the sub-region R(1) and/or increase a number of smaller throughput superblocks {XBLK$_{LOWER\_THROUGHPUT}$}, but the present invention is not limited thereto.

In Step S29, the memory controller 110 may update or calculate the previous bad block indicator pre_N (e.g., the previous bad block indicator pre_N may be equal to a sum of a bad block count of bad blocks {BLK(k)} corresponding to Fblock≤FbTh and a candidate bad block count of candidate bad blocks {BLK(k)} corresponding to Fblock>FbTh in the bad block distribution), wherein the candidate bad blocks {BLK(k)} may include bad blocks {BLK(k)} corresponding to FbTh<Fblock≤FbTh3 in target planes {PLANE$_{TARGET}$(0), . . . , PLANE$_{TARGET}$(I_plane)} that have been checked at a current time point (e.g., a time point when Step S29 is executed), and "FbTh3" may represent a next level of the candidate value of the latest bad block selection threshold FbTh after fine-tuning the bad block selection threshold FbTh, for indicating a next level of the maximum value of the bad block distribution, but the present invention is not limited thereto. According to some embodiments, the candidate bad blocks {BLK(k)} in Step S29 may vary. For example, the candidate bad blocks {BLK(k)} may include bad blocks {BLK(k)} corresponding to FbTh<Fblock≤FbTh3 in the global planes {PLANE}.

In Step S30, starting from the boundary (between the maximum throughput superblock region R$_{MAX\_THROUGHPUT}$(1) and the remaining region R$_{REMAIN}$(1)) of the first reserved block threshold Reserved_BLK_Th(1) and the global plane PLANE (p=0), the memory controller 110 may re-arrange the at least one portion of bad blocks {BLK(k)}.

In Step S31, the memory controller 110 may store positions of respective starting bad blocks of the global planes {PLANE} as a processing result of the current way {WAY(Intlv)}, for generating the at least one BR management table (e.g., the BR management table 120BR and/or the temporary BR management table 116BR).

In Step S32, the memory controller 110 may generate the at least one BR management table (e.g., the BR management table 120BR and/or the temporary BR management table 116BR), and more particularly, may select the minimum sub-region R(1) from respective temporary sub-regions {R(1)} of the multiple ways {WAY(Intlv)|Intlv=0, . . . , (WAY$_{TOTAL}$-1)} (indicated by WAY$_{TOTAL}$ the processing results) according to respective processing results of the multiple ways {WAY(Intlv)|Intlv=0, . . . , (WAY$_{TOTAL}$-1)} for acting as a shared sub-region R(1), to configure each of the respective sub-regions {R(1)} of the multiple ways {WAY(Intlv)|Intlv=0, . . . , (WAY$_{TOTAL}$-1)} to be equal to the shared sub-region R(1) and generate the at least one BR management table corresponding to configuration of the shared sub-region R(1).

For better comprehension, the method may be illustrated with the working flow shown in FIG. 7, but the present invention is not limited thereto. According to some embodiments, one or more steps may be added, deleted, or changed in the working flow shown in FIG. 7. For example, after leaving the first loop including Steps S23-S26, the memory controller 110 may directly perform operations of Step S30 according to the latest bad block selection threshold FbTh, without executing the second loop including Steps S27-S29 one or more times to fine-tune the bad block selection threshold FbTh. In another example, assuming that there are not many bad blocks in the bad block distribution, the memory controller 110 may leave the first loop because the condition "I_plane<(PLANEMAX-1)" is satisfied. Under this situation, the memory controller 110 may further check whether the bad block selection threshold FbTh is less than Fblock$_{MAX}$ in Step S27, to avoid any possible lockup (e.g., being unable to leave the second loop). More particularly, in Step S27, the memory controller 110 may determine whether the bad block selection threshold FbTh is less than Fblock$_{MAX}$ and the previous bad block indicator pre_N is less than or equal to the bad block indicator upper limit $N_{MAX}$ (which may be re-labeled as "FbTh<Fblock$_{MAX}$ && pre_N≤$N_{MAX}$" in FIG. 7 for brevity). If Yes (e.g., FbTh<Fblock$_{MAX}$ and pre_N≤$N_{MAX}$), Step S28 is entered; if No, Step S30 is entered. In addition, the memory controller 110 may control the candidate values FbTh2 and FbTh3 to not exceed FblockMAX to avoid any possible calculation errors. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing storage space management of a memory device with aid of dynamic block configuration, the memory being applied to a memory controller of the memory device, the memory device comprising the memory controller and a non-volatile (NV) memory, the non-volatile memory comprising at least one NV memory element, the at least one NV memory element comprising a plurality of blocks, wherein any of the plurality of blocks belongs to one of a plurality of planes of the at least one NV memory element, the method comprising:

utilizing the memory controller to dynamically set a first reserved block threshold according to a target performance, configure at least one portion of blocks among the plurality of blocks as multiple first blocks in a first region according to the first reserved block threshold, wherein the memory controller reserves the multiple first blocks for data access, and utilizing the memory controller to configure multiple second blocks in a second region, and configure a specific number of blocks of the plurality of blocks as a superblock, the specific number of blocks comprising blocks belonging to the plurality of planes, respectively;

combining the multiple first blocks into a set of first superblocks in the first region, wherein a block count of first blocks within each first superblock in the set of first superblocks is equal to a first predetermined block count, and a superblock count of the set of first superblocks is equal to the first reserved block threshold; and combining at least one portion of second blocks among the multiple second blocks into a set of second superblocks in the second region, wherein a block count of second blocks within each second superblock in the set of second superblocks is less than the first predetermined block count, and the first reserved block threshold is less than a minimum non-damaged block count among respective non-damaged block counts of the plurality of planes, for the memory controller to increase an available storage capacity of the memory device by increasing a ratio of a size of the second region to a size of the first region.

2. The method of claim 1, wherein the memory controller is arranged to set the first reserved block threshold to be less than the minimum non-damaged block count and be greater than or equal to a default value, to control a performance-guaranteed storage capacity of the memory device to be greater than or equal to a predetermined performance-guaranteed storage capacity, for data access corresponding to the first target performance.

3. The method of claim 2, wherein the first target performance represents a maximum throughput of the memory device regarding data access.

4. The method of claim 1, wherein the memory controller is arranged to control the superblock count of the set of first superblocks to be equal to the first reserved block threshold, rather than a maximum available reserved block threshold, to increase a second superblock count in the second region by increasing a second block count in a plane with the minimum non-damaged block count, for balancing a performance-guaranteed storage capacity and the available storage capacity of the memory device, wherein the maximum available reserved block threshold represents the minimum non-damaged block count.

5. The method of claim 1, wherein the memory controller is arranged to use second blocks in a plane with the minimum non-damaged block count as a margin for configuring one or more additional second superblocks in the second region, wherein a block count of second blocks within each second superblocks in the one or more additional second superblocks is less than the first predetermined block count.

6. The method of claim 1, wherein the at least one NV memory element represents a plurality of NV memory elements, any of the plurality of blocks belongs to one of multiple planes of a NV memory element in the plurality of NV memory elements, to allow the memory controller to configure the blocks belonging to the plurality of planes, respectively, as the superblock, to achieve the first target performance by simultaneous access.

7. The method of claim 1, wherein the first target performance represents a maximum throughput of the memory device regarding data access.

8. The method of claim 1, wherein the at least one portion of blocks represents non-damaged blocks among the plurality of blocks, rather than any damaged blocks.

9. The method of claim 1, wherein the second region comprises multiple sub-regions, and the multiple sub-regions comprise a first sub-region and a second sub-region, wherein the set of second superblocks is located in the first sub-region; and the memory controller is arranged to determine a boundary between the first sub-region and the second sub-region according to any of a sub-region boundary default setting, a sub-region boundary user setting, and a statistical result of the plurality of blocks.

10. The method of claim 1, wherein the memory controller is arranged to determine the first reserved block threshold according to any of a reserved block threshold default setting, a reserved block threshold user setting, and a statistical result of the plurality of blocks.

11. A memory controller of a memory device, the memory device comprising the memory controller and a non-volatile (NV) memory, the NV memory comprising at least one NV memory element, the at least one NV memory element comprising a plurality of blocks, wherein any of the plurality of blocks belongs to one of a plurality of planes of the at least one NV memory element, the memory controller comprising:

a processing circuit, arranged to control the memory controller according to a plurality of host commands from a host device, to allow the host device to access the NV memory through the memory controller, wherein the processing circuit is arranged to perform storage space management of the memory device with aid of dynamic block configuration; and a transmission interface circuit, arranged to perform communications with the host device;

wherein:

the memory controller dynamically sets a first reserved block threshold according to a target performance, configures at least one portion of blocks among the plurality of blocks as multiple first blocks in a first region according to the first reserved block threshold, wherein the memory controller reserves the multiple first blocks for data access, and the memory controller configures multiple second blocks in a second region, and configures a specific number of blocks of the plurality of blocks as a superblock, the specific number of blocks comprising blocks belonging to the plurality of planes, respectively;

the memory controller combines the multiple first blocks into a set of first superblocks in the first region, wherein a block count of first blocks within each first superblock in the set of first superblocks is equal to a first predetermined block count, and a superblock count of the set of first superblocks is equal to the first reserved block threshold; and the memory controller combines at least one portion of second blocks among the multiple second blocks into a set of second superblocks in the second region, wherein a block count of second blocks within each second superblock in the set of second superblocks is less than the first predetermined block count, and the first reserved block threshold is less than a minimum non-damaged block count among respective non-damaged block counts of the plurality of planes, for the memory controller to increase an available storage capacity of the memory device by increasing a ratio of a size of the second region to a size of the first region.

12. The memory device comprising the memory controller of claim 11, wherein the memory device comprises:
   the NV memory, configured to store information; and
   the memory controller, coupled to the NV memory, configured to control operations of the memory device.

13. An electronic device comprising the memory device of claim 12, and further comprising:

the host device, coupled to the memory device, wherein the host device comprises:
  at least one processor, arranged for controlling operations of the host device; and
  a power supply circuit, coupled to the at least one processor, arranged for providing power to the at least one processor and the memory device;
wherein the memory device provides the host device with storage space.

* * * * *